US012799003B2

(12) United States Patent
Bawendi et al.

(10) Patent No.: US 12,799,003 B2
(45) Date of Patent: Nov. 17, 2026

(54) THIN-FILMS FOR CAPTURING HEAVY METAL

(71) Applicant: MASSACHUSETTS INSTITUTE OF TECHNOLOGY, Cambridge, MA (US)

(72) Inventors: Moungi Bawendi, Cambridge, MA (US); Vladimir Bulovic, Lexington, MA (US); Richard Swartwout, Cambridge, MA (US); Nicole Moody, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 402 days.

(21) Appl. No.: 17/432,534

(22) PCT Filed: Feb. 22, 2020

(86) PCT No.: PCT/US2020/019380

§ 371 (c)(1),
(2) Date: Aug. 20, 2021

(87) PCT Pub. No.: WO2020/172644

PCT Pub. Date: Aug. 27, 2020

(65) Prior Publication Data

US 2022/0135442 A1 May 5, 2022

Related U.S. Application Data

(60) Provisional application No. 62/809,547, filed on Feb. 22, 2019.

(51) Int. Cl.

*C02F 1/42* (2023.01)
*C02F 101/20* (2006.01)
*C02F 103/34* (2006.01)

(52) U.S. Cl.

CPC .......... *C02F 1/42* (2013.01); *C02F 2001/425* (2013.01); *C02F 2101/20* (2013.01); *C02F 2103/346* (2013.01)

(58) Field of Classification Search

CPC .......... C02F 1/42; C02F 2101/20; B01J 45/00
See application file for complete search history.

(56) References Cited

U.S. PATENT DOCUMENTS 4,219,435 A * 8/1980 Biard ................ C11D 17/0082 510/508
4,614,592 A 9/1986 Googin et al.

(Continued)

FOREIGN PATENT DOCUMENTS

EP 0190896 A2 8/1996
JP 2010-053266 A 3/2010

(Continued)

OTHER PUBLICATIONS

RU2074019 (C1) Translation (Abstract and Description) (Year: 1997).*

(Continued)

*Primary Examiner* — Richard C Gurtowski
*Assistant Examiner* — Marriah Ellington
(74) *Attorney, Agent, or Firm* — Wolf, Greenfield & Sacks, P.C.

(57) ABSTRACT

A heavy metal capture composition, devices including the composition, and a method of reducing heavy metal contamination in the environment is described.

11 Claims, 28 Drawing Sheets

(56) References Cited

U.S. PATENT DOCUMENTS

| | | | | |
|---|---|---|---|---|
| 5,512,131 | A | 4/1996 | Kumar et al. | |
| 6,180,239 | B1 | 1/2001 | Whitesides et al. | |
| 6,251,303 | B1 | 6/2001 | Bawendi et al. | |
| 6,322,901 | B1 | 11/2001 | Bawendi et al. | |
| 6,518,168 | B1 | 2/2003 | Clem et al. | |
| 7,332,211 | B1 | 2/2008 | Bulovic et al. | |
| 7,767,260 | B2 | 8/2010 | Peng et al. | |
| 9,391,287 | B1 * | 7/2016 | Huang | H10K 85/50 |
| 2002/0011446 | A1 * | 1/2002 | Lundquist | B01J 20/0211 210/660 |
| 2004/0023010 | A1 | 2/2004 | Bulovic et al. | |
| 2006/0196375 | A1 | 9/2006 | Coe-Sullivan et al. | |
| 2009/0274634 | A1 * | 11/2009 | Collins | B01J 20/327 536/25.4 |
| 2010/0176044 | A1 * | 7/2010 | Domb | B01J 20/103 210/287 |
| 2011/0079283 | A1 * | 4/2011 | Christensen | H10F 19/804 257/E31.015 |
| 2011/0146786 | A1 * | 6/2011 | Cohen | B32B 17/10788 257/E31.008 |
| 2012/0132267 | A1 * | 5/2012 | Shinohara | H01G 9/2027 136/252 |
| 2012/0132852 | A1 * | 5/2012 | Inoue | B01J 20/321 521/134 |
| 2014/0332714 | A1 * | 11/2014 | Inoue | C08J 9/26 252/180 |
| 2016/0023202 | A1 * | 1/2016 | Hadi Myavagh | C02F 1/42 427/372.2 |

FOREIGN PATENT DOCUMENTS

| | | | |
|---|---|---|---|
| RU | 2074019 | C1 * | 2/1997 |
| RU | 94031674 | A1 | 5/1997 |
| RU | 2653037 | C1 | 5/2018 |

OTHER PUBLICATIONS

Venkatesan et al. J. Mater. Chem. A, 2018, 6, 10085. DOI: 10.1039/c8ta01729h (Year: 2018).*

Hou et al. Polymers 2019, 11, 143; doi:10.3390/polym11010143 (Year: 2019).*

S. Hosseini et al. / Applied Surface Science 300 (2014) 43â50. http://dx.doi.org/10.1016/j.apsusc.2014.01.203 (Year: 2014).*

Ghosh, A and Kofinas, P. ECS Transactions, 11 (29) 131-137 (2008) (Year: 2008).*

International Search Report issued on May 7, 2020 in International Application No. PCT/US2020/019380.

Written Opinion of the International Searching Authority issued on May 7, 2020 in International Application No. PCT/US2020/019380.

Bag et al., Kinetics of Ion Transport in Perovskite Active Layers and Its Implications for Active Layer Stability. J Am Chem Soc. Oct. 14, 2015;137(40):13130-7. doi: 10.1021/jacs.5b08535. Epub Oct. 5, 2015.

Bulovic et al., Transparent light-emitting devices. Nature. Mar. 1996; 380: 29. 1 page.

Chuang et al., Improved performance and stability in quantum dot solar cells through band alignment engineering. Nat Mater. Aug. 2014;13(8):796-801. doi: 10.1038/nmat3984. Epub May 25, 2014.

Gu et al., Transparent organic light emitting devices. Appl Phys Lett. 1996; 68: 2606. 3 pages.

Hines et al., Colloidal PbS nanocrystals with size-tunable near-infrared emission: Observation of post-synthesis self narrowing of the particle size distribution. Adv Mater. Nov. 2003. 15(21):1844-9.

Lin et al., Correlating the Active Layer Structure and Composition with the Device Performance and Lifetime of Amino-Acid-Modified Perovskite Solar Cells. ACS Appl Mater Interfaces. Sep. 15, 2021;13(36):43505-43515. doi: 10.1021/acsami.1c08279. Epub Sep. 2, 2021.

United States Environmental Protection Agency. Public Meeting on Waste Leaching. In Proceedings of the Environmental Protection Agency; 1999; pp. 1-44.

United States Environmental Protection Agency. Method 1311: Toxicity Characteristic Leaching Procedure. In Final Update I to the Third Edition of the Test Methods for Evaluating Solid Waste, Physical/Chemical Methods; 1992. 35 pages.

Zhao et al., Colloidal PbS quantum dot solar cells with high fill factor. ACS Nano. Jul. 27, 2010;4(7):3743-52.

Beek et al., Hybrid zinc oxide conjugated polymer bulk heterojunction solar cells. J Phys Chem B. May 19, 2005;109(19):9505-16. doi: 10.1021/jp050745x.

* cited by examiner

Dispersion

Polymer Mixture or Co-polymer

Bi-Layer

Multi-Layer 10.9 ± 0.3 ppm Leached Pb 2.4 ± 0.1 ppm Leached Pb (19%)

21.8 ± 0.4 ppm Leached Pb 8.3 ± 0.7 ppm Leached Pb (92%)

THIN-FILMS FOR CAPTURING HEAVY METAL

CLAIM OF PRIORITY

This application is a National Phase application filed under 35 USC § 371 of International Application No. PCT/US2020/019380, filed on Feb. 22, 2020, which claims the benefit of prior filed U.S. Provisional Application No. 62/809,547, filed Feb. 22, 2019, each of which is incorporated by reference in its entirety.

TECHNICAL FIELD

This invention relates to thin films for capturing heavy metals.

BACKGROUND

In recent years, many low cost semiconductors have been explored for use in electronic devices and optoelectronics such as LEDs and solar cells. Many of these new materials use heavy metals such as, for example, cadmium, lead, and cesium as organic salts or halide salts. This makes these electronics susceptible to environmental degradation and environmental leaching.

SUMMARY

In one aspect, a heavy metal capture composition can include a matrix material; and an ion exchangeable material. The ion exchangeable material binds to the heavy metal to reduce an amount of heavy metal in the environment.

In certain circumstances, the amount of heavy metal in the environment can be reduced by at least 10%, 15%, 20%, 25%, 30%, 35%, 40%, 50%, 60%, 70%, 80%, 90%, 95%, 99% or over 99% when the heavy metal capture composition is present compared to when the when the heavy metal capture composition is not present. In certain circumstances, the amount of heavy metal leached into the environment can be reduced by 90%, 95%, 99%, or over 99%.

In certain circumstances, the ion exchangeable material traps the heavy metal in the composition, or forms a flocculate or a precipitate with the heavy metal.

In certain circumstances, the ion exchangeable material can include phosphate, tungstate, molybdate, sulfate, sulfide or a silicate. For example, the phosphate can be an ammonium phosphate, an alkali metal phosphate, or an alkaline earth metal phosphate. For example, the tungstate can be an ammonium tungstate, an alkali metal tungstate, or an alkaline earth metal tungstate. For example, the molybdate can be an ammonium molybdate, an alkali metal molybdate, or an alkaline earth metal molybdate. For example, the tungstate can be an ammonium tungstate, an alkali metal tungstate, an alkaline earth metal tungstate. For example, the sulfide or the silicate can be an ammonium silicate, an alkali metal silicate, an alkaline earth metal silicate, an ammonium sulfide, an alkali metal sulfide, or an alkaline earth metal sulfide. In certain circumstances, the silicate can be a metasilicate or an orthosilicate. Examples of suitable sulfide or silicate materials can include a lithium silicate, a sodium silicate, a potassium silicate, lithium sulfide, sodium sulfide, or potassium sulfide. Examples of suitable phosphate materials can include a lithium phosphate, a sodium phosphate, a potassium phosphate, calcium phosphate or strontium phosphate.

In certain circumstances, the ion exchangeable material is at least 5%, 10%, 15%, 20%, 25%, 30%, 35%, 40%, 50%, 60%, 70%, 80%, or 90% of the heavy metal capture composition by weight.

In certain circumstances, the heavy metal can be lead, mercury, cesium, cadmium, barium or chromium.

In certain circumstances, the matrix material can be a polymer. For example, the matrix material can include an organic or inorganic polymer including one or more complexing moieties. The complexing moieties can include a carboxyl, amine, acetate, sulfoxide, alkoxy, amide or ether. Examples of suitable matrix materials include a polyethylene oxide, a polyvinyl acetate, a polyol, a polyacrylate (including a polymethacrylate), a polyamine, a functionalize styrene, or a functionalize silicone, or a copolymer including one or more of these polymers.

In another aspect, a device can include an active material including a heavy metal; and a heavy metal capture composition, such as a composition described herein, adjacent to the active material. In certain circumstances, the heavy metal capture composition can include a layer or coating on a surface of the device.

In another aspect, a method of reducing an amount of heavy metal in an environment can include contacting a heavy metal capture composition, such as a composition described herein, with a heavy metal in an environment around a device containing a heavy metal or an environment containing the heavy metal. In certain circumstances, the layer or coating can be a sheet, patch or strip, wherein the composition has a thickness of between 100 nm and 10 mm.

Other aspects, embodiments, and features will be apparent from the following description, the drawings, and the claims.

BRIEF DESCRIPTION OF THE DRAWINGS

FIG. 3A is a photo of a PbS quantum dot film on a glass substrate prior to extraction. FIG. 3B is a photo of strips of the carboxylate polymer ethylene vinyl acetate (EVA) prior to extraction. FIG. 3C is a photo of an extraction of a PbS quantum dot film on glass and EVA strips after 18±2 hours in acetic acid buffer solution. The color change of the EVA strips from colorless to brown indicates the absorption of leached lead from the semiconductor nanocrystals or quantum dots.

DETAILED DESCRIPTION

Figure 1A:
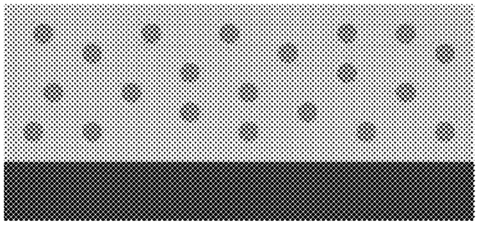
FIGS. 1A-1E show configurations for a heavy metal encapsulate composition.
Figure 1B:
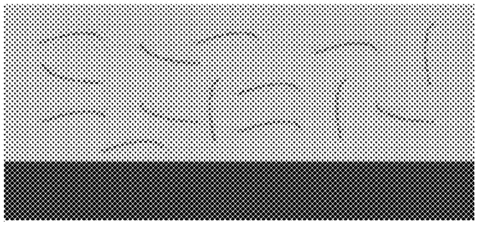
Figure 1C:
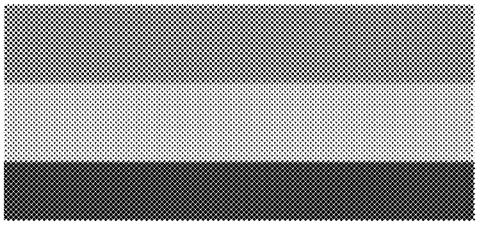
Figure 1D:
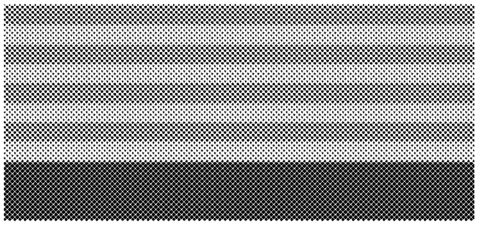
Figure 1E:
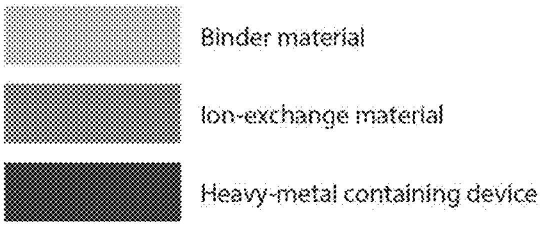
Figure 2:
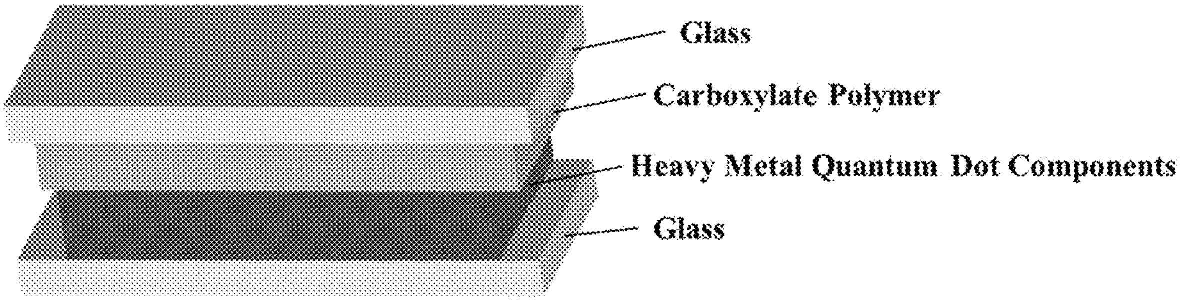
FIG. 2 shows a schematic representation of glass/carboxylate polymer/glass architecture to encapsulate quantum dot components of a device and prevent the release of heavy metals into the environment.

In general, a heavy metal capture composition is a composition that captures or traps heavy metals in the event of degradation of a device containing a heavy metal-containing material. For example, the heavy metal capture composition can be a barrier film on a device that captures heavy metals in the event of device degradation, thereby preventing heavy metal leaching into the environment. The heavy metal capture composition can be barrier paint, a barrier layer or barrier film on a surface of a device such as, for example, a photovoltaic device or display device including the heavy metal, for example, a lead or cadmium containing device.

The heavy metal capture composition can be a functionalized material that can serve as a binder for various thin film and composite structures including a heavy metal, for example, a heavy metal ion. For example, the heavy metal capture composition can include an ion exchange material. The ion exchange material can include an organic compound, an inorganic compound or a polymeric compound.

The heavy metal capture composition impedes the leaching of the heavy metal into the environment surrounding the device. Under the same leaching conditions, the amount of heavy metal that escapes or leaches into the surrounding environment is reduced by at least 10%, 15%, 20%, 25%, 30%, 35%, 40%, 50%, 60%, 70%, 80%, 90%, 95%, 99% or over 99% when the heavy metal capture composition is present compared to when the when the heavy metal capture composition is not present. The sequestered heavy metal can be trapped in the composition, a flocculate or precipitate. The heavy metal capture composition is not required to fully capture the heavy metal, but it is important that it reduce heavy metal contamination levels under comparable leaching conditions.

In certain circumstances, the geometry of the heavy metal capture composition can include a functionalized material in a film format covering or coating an electronic device for preventing heavy metal leaching from the device. Alternatively, the combination and use of the heavy metal capture composition may also be used for heavy metal recycling in a non-thin-film format. For example, perovskites and other semiconductor materials, such as and quantum dots, also known as semiconductor nanocrystals, show promising potential as active layer materials in low-cost flexible photovoltaics. The heavy metal capture composition can be a processable composition, allowing it to be processed by solution methods, making the heavy metal capture composition compatible with roll-to-roll manufacturing methods and other methods of depositing the composition including ink jet printing, painting and coating techniques. The heavy metal capture composition is positioned so that any heavy metal escaping the device will have to contact or pass through the heavy metal capture composition, which then prevents or hinders further migration of the heavy metal, thereby protecting the environment surrounding the device from being contaminated by the heavy metal.

In general, the heavy metal capture composition can be a combination of a functional complexing material with an ion-exchangeable material (either organic or inorganic). If a heavy metal is leaching or otherwise escaping from the device, the solvated heavy metal encounters the heavy metal capture composition and is captured or hindered by the heavy metal capture composition, for example, in the thin film packaging. For example, solvated lead ions can ion exchange to form a highly stable solid with the heavy metal capture composition as well as be captured and flocculated by a complexing polymer binder. In addition, structuring this barrier next to the active electrical device limits geometrical leaching and increases heavy metal capture. Various forms of this composite are shown in FIGS. 1A-1E. In certain embodiments, the heavy metal capture composition can be located as close as possible to the material in the device that contains the heavy metal. The heavy metal capture composition can be a sheet, coating or other layer on a surface of the device. The heavy metal capture composition can be a patch, striped, or continuous layer. The heavy metal capture composition can have a thickness of between 100 nm and 10 mm, for example, 1 to 1,000 microns.

The heavy metal can include a metal or metal ion. The heavy metal can include lead, mercury, cesium, cadmium, barium or chromium, or other metal or metal ion that can leach into water and contaminate the environment.

The functional complexing material can include a matrix material or a binder. The matrix material or binder can be an organic or inorganic polymer including one or more complexing moieties. The complexing moiety can include a carboxyl, an ether, an ester, or other metal-ion binding moiety. For example, the complexing moiety can be a carboxyl, amine, acetate, sulfoxide, alkoxy, amide or ether functional polymer, such as, for example, a polyethylene oxide, a polyvinyl acetate, a polyol, a polyacrylate (including a polymethacrylate), a polyamine, a functionalize styrene, or a functionalize silicone, or a copolymer including one or more of these polymers. The polymer can be cross linked. For example, epoxide or vinyl groups can be used to cross link the polymer and create more of a hydro-gel than a dissolvable polymer. The material can be deposited by spin coating, slot die, hot pressing, ink jet printing, roller printing, painting or laminated. Multiple layers with different inks can be deposited in orthogonal solvents.

The ion exchange composition can be a composition including an anion that forms a less soluble composition with the heavy metal compared to a soluble heavy metal. For example, the ion exchange composition can include a silicate, for example, an ammonium silicate, alkali metal silicate or alkaline earth metal silicate, metasilicate or orthosilicate. The silicate can include a lithium, a sodium, or a potassium silicate. In another example, the ion exchange composition can include a sulfide, for example, an ammonium sulfide, alkali metal sulfide or alkaline earth metal sulfide. The sulfide can include lithium sulfide, sodium sulfide, or potassium sulfide. In another example, the ion exchange composition can include a phosphate, for example an ammonium phosphate, an alkali metal phosphate, an alkaline earth metal phosphate.

The loading of the ion exchange composition in the heavy metal capture composition can vary, depending on one or more of the device, the heavy metal, or environmental conditions. The ion exchange composition can be at least 5%, 10%, 15%, 20%, 25%, 30%, 35%, 40%, 50%, 60%, 70%, 80%, or 90% of the heavy metal capture composition, by weight.

The highest efficiency perovskite solar cells utilize high temperature (up to 500° C.) sintered $TiO_2$ films High temperature processing conditions may present a limitation for some future developments in perovskite solar cells due to potentially complicated manufacturing and incompatibility with flexible substrates. This underscores the necessity for the exploration of alternative materials that are suitable for low temperature processing. A variety of organic, inorganic, and composite/bilayer charge transport materials have been explored within the framework of sub-150° C. low temperature processing.

PbS nanocrystals have been used as a near-infrared co-sensitizer. Enhanced performance of sensitized solar cells with $PbS/CH_3NH_3PbI_3$ core/shell quantum dots have been reported.

A photovoltaic device can include two layers separating two electrodes of the device. The material of one layer can be chosen based on the material's ability to transport holes, or the hole transporting layer (HTL). The material of the other layer can be chosen based on the material's ability to transport electrons, or the electron transporting layer (ETL). The electron transporting layer typically can include an absorber layer. When a voltage is applied and the device is illuminated, one electrode accepts holes (positive charge carriers) from the hole transporting layer, while the other electrode accepts electrons from the electron transporting layer; the holes and electrons originate as excitons in the absorptive material. The device can include an absorber layer between the HTL and the ETL. The absorber layer can include a material selected for its absorption properties, such as absorption wavelength or linewidth.

Figure 8:
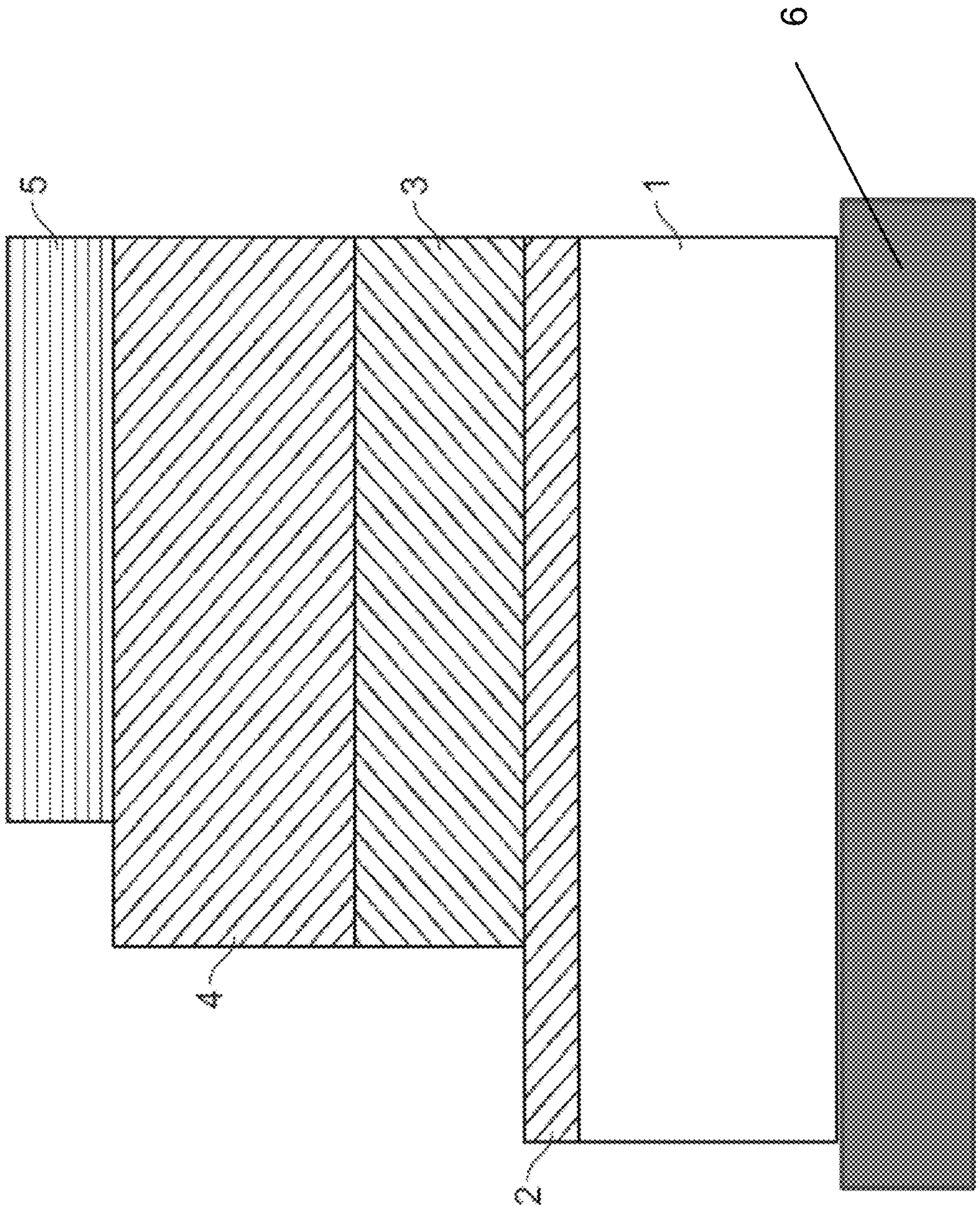
FIG. 8 shows a schematic of a device including a heavy metal capture composition.

As shown in FIG. 8, a device can include a heavy metal capture composition 6. The heavy metal capture composition can be a layer on an external surface of a device. The heavy metal capture composition can include have a plurality of heavy metal binding domains. The heavy metal binding domains can be free ions or can be functional groups on a polymer, or a combination thereof. The number of layers depicted in FIG. 8 are exemplary and do not limit the scope of applicability of the principles described herein. The device can have two, three, four, five or more functional layers.

A photovoltaic device can have a structure such as shown in FIG. 8, in which a first electrode 2, a first layer 3 in contact with the electrode 2, a second layer 4 in contact with the layer 3, and a second electrode 5 in contact with the second layer 4. First layer 3 can be a hole transporting layer and second layer 4 can be an electron transporting layer. At least one layer can be non-polymeric. The layers can include an inorganic material. One of the electrodes of the structure is in contact with a substrate 1. Each electrode can contact a power supply to provide a voltage across the structure. Photocurrent can be produced by the absorber layer when a voltage of proper polarity and magnitude is applied across the device. First layer 3 can include a plurality of semiconductor nanocrystals, for example, a substantially monodisperse population of nanocrystals.

A hole transporting layer can include a plurality of nanocrystals. The hole transporting layer that includes nanocrystals can be a monolayer, of nanocrystals, or a multilayer of nanocrystals. In some instances, the layer including nanocrystals can be an incomplete layer, i.e., a layer having regions devoid of material such that layers adjacent to the nanocrystal layer can be in partial contact. The nanocrystals and at least one electrode have a band gap offset sufficient to transfer a charge carrier from the nanocrystals to the first electrode or the second electrode. The charge carrier can be a hole or an electron. The ability of the electrode to transfer a charge carrier permits the photoinduced current to flow in a manner that facilitates photodetection.

Photovoltaic devices including semiconductor nanocrystals can be made by spin-casting a solution containing the HTL organic semiconductor molecules and the semiconductor nanocrystals, where the HTL formed underneath of the semiconductor nanocrystal monolayer via phase separation (see, for example, U.S. patent application Ser. No. 10/400,907, filed Mar. 28, 2003, and U.S. Patent Application Publication No. 2004/0023010, each of which is incorporated by reference in its entirety). This phase separation technique reproducibly placed a monolayer of semiconductor nanocrystals between an organic semiconductor HTL and ETL, thereby effectively exploiting the favorable light absorption properties of semiconductor nanocrystals, while minimizing their impact on electrical performance. Devices made by this technique were limited by impurities in the solvent, by the necessity to use organic semiconductor molecules that are soluble in the same solvents as the semiconductor nanocrystals. The phase separation technique was unsuitable for depositing a monolayer of semiconductor nanocrystals on top of both a HTL and a HIL (due to the solvent destroying the underlying organic thin film). Nor did the phase separation method allow control of the location of semiconductor nanocrystals that emit different colors on the same substrate; nor patterning of the different color emitting nanocrystals on that same substrate.

Moreover, the organic materials used in the transport layers (i.e., hole transport, hole injection, or electron transport layers) can be less stable than the semiconductor nanocrystals used in the absorber layer. As a result, the operational life of the organic materials limits the life of the device. A device with longer-lived materials in the transport layers can be used to form a longer-lasting light emitting device.

The substrate can be opaque or transparent. A transparent substrate can be used to in the manufacture of a transparent device. See, for example, Bulovic, V. et al., *Nature* 1996, 380, 29; and Gu, G. et al., *Appl. Phys. Lett.* 1996, 68, 2606-2608, each of which is incorporated by reference in its entirety. The substrate can be rigid or flexible. The substrate can be plastic, metal or glass. The first electrode can be, for example, a high work function hole-injecting conductor, such as an indium tin oxide (ITO) layer. Other first electrode materials can include gallium indium tin oxide, zinc indium tin oxide, titanium nitride, or polyaniline. The second electrode can be, for example, a low work function (e.g., less than 4.0 eV), electron-injecting, metal, such as Al, Ba, Yb, Ca, a lithium-aluminum alloy (Li:Al), or a magnesium-silver alloy (Mg:Ag). The second electrode, such as Mg:Ag, can be covered with an opaque protective metal layer, for example, a layer of Ag for protecting the cathode layer from atmospheric oxidation, or a relatively thin layer of substantially transparent ITO. The first electrode can have a thickness of about 500 Angstroms to 4000 Angstroms. The first layer can have a thickness of about 50 Angstroms to about 5 micrometers, such as a thickness in the range of 100 Angstroms to 100 nm, 100 nm to 1 micrometer, or 1 micrometer to 5 micrometers. The second layer can have a thickness of about 50 Angstroms to about 5 micrometers, such as a thickness in the range of 100 Angstroms to 100 nm, 100 nm to 1 micrometer, or 1 micrometer to 5 micrometers. The second electrode can have a thickness of about 50 Angstroms to greater than about 1000 Angstroms.

A hole transporting layer (HTL) or an electron transporting layer (ETL) can include an inorganic material, such as an inorganic semiconductor. The inorganic semiconductor can be any material with a band gap greater than the emission energy of the emissive material. The inorganic semiconductor can include a metal chalcogenide, metal pnictide, or elemental semiconductor, such as a metal oxide, a metal sulfide, a metal selenide, a metal telluride, a metal nitride, a metal phosphide, a metal arsenide, or metal arsenide. For example, the inorganic material can include zinc oxide, a titanium oxide, a niobium oxide, an indium tin oxide, copper oxide, nickel oxide, vanadium oxide, chromium oxide, indium oxide, tin oxide, gallium oxide, manganese oxide, iron oxide, cobalt oxide, aluminum oxide, thallium oxide, silicon oxide, germanium oxide, lead oxide, zirconium oxide, molybdenum oxide, hafnium oxide, tantalum oxide, tungsten oxide, cadmium oxide, iridium oxide, rhodium oxide, ruthenium oxide, osmium oxide, a zinc sulfide, zinc selenide, zinc telluride, cadmium sulfide, cadmium selenide, cadmium telluride, mercury sulfide, mercury selenide, mercury telluride, silicon carbide, diamond (carbon), silicon, germanium, aluminum nitride, aluminum phosphide, aluminum arsenide, aluminum antimonide, gallium nitride, gallium phosphide, gallium arsenide, gallium antimonide, indium nitride, indium phosphide, indium arsenide, indium antimonide, thallium nitride, thallium phosphide, thallium arsenide, thallium antimonide, lead sulfide, lead selenide, lead telluride, iron sulfide, indium selenide, indium sulfide, indium telluride, gallium sulfide, gallium selenide, gallium telluride, tin selenide, tin telluride, tin sulfide, magnesium sulfide, magnesium selenide, magnesium telluride, or a mixture thereof. The metal oxide can be a mixed metal oxide, such as, for example, ITO. In a device, a layer of pure metal oxide (i.e., a metal oxide with a single substantially pure metal) can develop crystalline regions over time degrading the performance of the device. A mixed metal oxide can be less prone to forming such crystalline regions, providing longer device lifetimes than available with pure metal oxides. The metal oxide can be a doped metal oxide, where the doping is, for example, an oxygen deficiency, a halogen dopant, or a mixed metal. The inorganic semiconductor can include a dopant. In general, the dopant can be a p-type or an n-type dopant. An HTL can include a p-type dopant, whereas an ETL can include an n-type dopant.

Inorganic semiconductors have been proposed for charge transport to semiconductor nanocrystals in devices. Inorganic semiconductors are deposited by techniques that require heating the substrate to be coated to a high temperature. However, the top layer semiconductors must be deposited directly onto the nanocrystal layer, which is not robust to high temperature processes, nor suitable for facile epitaxial growth. Epitaxial techniques (such as chemical vapor deposition) can also be costly to manufacture, and generally cannot be used to cover a large area, (i.e., larger than a 12 inch diameter wafer).

Advantageously, the inorganic semiconductor can be deposited on a substrate at a low temperature, for example, by sputtering. Sputtering is performed by applying a high voltage across a low-pressure gas (for example, argon) to create a plasma of electrons and gas ions in a high-energy state. Energized plasma ions strike a target of the desired coating material, causing atoms from that target to be ejected with enough energy to travel to, and bond with, the substrate.

The substrate or the device being manufactured is cooled or heated for temperature control during the growth process. The temperature affects the crystallinity of the deposited material as well as how it interacts with the surface it is being deposited upon. The deposited material can be polycrystalline or amorphous. The deposited material can have crystalline domains with a size in the range of 10 Angstroms to 1 micrometer. Doping concentration can be controlled by varying the gas, or mixture of gases, which is used for the sputtering plasma. The nature and extent of doping can influence the conductivity of the deposited film, as well as its ability to optically quench neighboring excitons. By growing one material on top of another, p-n or p-i-n diodes can be created. The device can be optimized for delivery of charge to or extraction of charge from a semiconductor monolayer.

The layers can be deposited on a surface of one of the electrodes by spin coating, dip coating, vapor deposition, sputtering, or other thin film deposition methods. The second electrode can be sandwiched, sputtered, or evaporated onto the exposed surface of the solid layer. One or both of the electrodes can be patterned. The electrodes of the device can be connected to a voltage source by electrically conductive pathways. Upon application of the voltage, light or charge is generated from the device.

Microcontact printing provides a method for applying a material to a predefined region on a substrate. The predefined region is a region on the substrate where the material is selectively applied. The material and substrate can be chosen such that the material remains substantially entirely within the predetermined area. By selecting a predefined region that forms a pattern, material can be applied to the substrate such that the material forms a pattern. The pattern can be a regular pattern (such as an array, or a series of lines), or an irregular pattern. Once a pattern of material is formed on the substrate, the substrate can have a region including the material (the predefined region) and a region substantially free of material. In some circumstances, the material forms a monolayer on the substrate. The predefined region can be a discontinuous region. In other words, when the material is applied to the predefined region of the substrate, locations including the material can be separated by other locations that are substantially free of the material.

In general, microcontact printing begins by forming a patterned mold. The mold has a surface with a pattern of elevations and depressions. A stamp is formed with a complementary pattern of elevations and depressions, for example by coating the patterned surface of the mold with a liquid polymer precursor that is cured while in contact with the patterned mold surface. The stamp can then be inked;

that is, the stamp is contacted with a material which is to be deposited on a substrate. The material becomes reversibly adhered to the stamp. The inked stamp is then contacted with the substrate. The elevated regions of the stamp can contact the substrate while the depressed regions of the stamp can be separated from the substrate. Where the inked stamp contacts the substrate, the ink material (or at least a portion thereof) is transferred from the stamp to the substrate. In this way, the pattern of elevations and depressions is transferred from the stamp to the substrate as regions including the material and free of the material on the substrate. Microcontact printing and related techniques are described in, for example, U.S. Pat. Nos. 5,512,131; 6,180,239; and 6,518,168, each of which is incorporated by reference in its entirety. In some circumstances, the stamp can be a featureless stamp having a pattern of ink, where the pattern is formed when the ink is applied to the stamp. See U.S. patent application Ser. No. 11/253,612, filed Oct. 21, 2005, which is incorporated by reference in its entirety. Additionally, the ink can be treated (e.g., chemically or thermally) prior to transferring the ink from the stamp to the substrate. In this way, the patterned ink can be exposed to conditions that are incompatible with the substrate.

Semiconductor materials, such as nanoparticles, with their broad absorption, narrow emission, high quantum yield and exceptional photostability, has drawn a lot of interest for its promising applications in biological imaging researches. Compared to conventional organic fluorophores, nanocrystals have shown advantages in multiple biological applications such as particle tracking and multiplexed imaging. Here, a color series of visible light emitting nanocrystals are developed with nearly unity photoluminescence (PL) quantum yield, symmetric and narrow emission spectral lineshapes (FWHM 20-25 nm) for highly multiplexed imaging.

An organic ligand can bind strongly to the surface of colloidal nanocrystallites can be used during particle synthesis, eliminating the need for ligand exchange and enabling large-scale production of high quality hybrid nanomaterials. The molecule is compatible with state-of-the-art synthesis methods of a large variety of semiconductor nanocrystallites and metal oxide nanoparticles, making this a general method for making derivatizable nanomaterials.

In certain circumstances, the semiconductor can be a perovskite, for example, a mercury, cesium or lead containing perovskite material. The semiconductor can be a nanoparticle. Perovskite materials have a relatively high solubility product constant and are therefore unstable, to put a handle on the surface is very difficult without using the ligands and methods described herein.

A semiconductor composition can include a semiconductor nanocrystal, and an outer layer including a ligand bound to the nanocrystal.

The semiconductor can include a core of a first semiconductor material. The first semiconductor material is a Group II-VI compound, a Group II-V compound, a Group III-VI compound, a Group III-V compound, a Group IV-VI compound, a Group compound, a Group II-IV-VI compound, or a Group II-IV-V compound. The first semiconductor material is ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, $Cd_3As_2$, $Cd_3P_2$ or mixtures thereof.

The semiconductor nanocrystal includes an optional second semiconductor material overcoated on the first semiconductor material. The first semiconductor material can have a first band gap, and the second semiconductor material can have a second band gap that is larger than the first band gap. The second semiconductor material is a Group II-VI compound, a Group II-V compound, a Group III-VI compound, a Group III-V compound, a Group IV-VI compound, a Group compound, a Group II-IV-VI compound, or a Group II-IV-V compound. The second semiconductor material is ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, $Cd_3As_2$, $Cd_3P_2$ or mixtures thereof.

Semiconductor nanocrystals demonstrate quantum confinement effects in their luminescence properties. When semiconductor nanocrystals are illuminated with a primary energy source, a secondary emission of energy occurs at a frequency related to the band gap of the semiconductor material used in the nanocrystal. In quantum confined particles, the frequency is also related to the size of the nanocrystal.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX (e.g., for a II-VI semiconductor material) or $M_3X_2$ (e.g., for a II-V semiconductor material), where M is cadmium, zinc, magnesium, mercury, aluminum, gallium, indium, lead, thallium, or mixtures thereof, and X is oxygen, sulfur, selenium, tellurium, nitrogen, phosphorus, arsenic, antimony, or mixtures thereof.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, both CdSe and CdS can be tuned in the visible region and InAs can be tuned in the infrared region. $Cd_3As_2$ can be tuned from the visible through the infrared.

A population of nanocrystals can have a narrow size distribution. The population can be monodisperse and can exhibit less than a 15% rms deviation in diameter of the nanocrystals, preferably less than 10%, more preferably less than 5%. Spectral emissions in a narrow range of between 10 and 100 nm full width at half max (FWHM) can be observed. Semiconductor nanocrystals can have emission quantum efficiencies (i.e., quantum yields, QY) of greater than 2%, 5%, 10%, 20%, 40%, 60%, 70%, 80%, or 90%. In some cases, semiconductor nanocrystals can have a QY of at least 90%, at least 91%, at least 92%, at least 93%, at least 94%, at least 95%, at least 96%, at least 97%, at least 97%, at least 98%, or at least 99%.

Size distribution during the growth stage of the reaction can be estimated by monitoring the absorption line widths of the particles. Modification of the reaction temperature in response to changes in the absorption spectrum of the particles allows the maintenance of a sharp particle size distribution during growth. Reactants can be added to the nucleation solution during crystal growth to grow larger crystals. By stopping growth at a particular nanocrystal average diameter and choosing the proper composition of the semiconducting material, the emission spectra of the nanocrystals can be tuned continuously over the wavelength range of 300 nm to 5 microns, or from 400 nm to 800 nm for CdSe and CdTe. The nanocrystal has a diameter of less than 150 Å. A population of nanocrystals has average diameters in the range of 15 Å to 125 Å.

The core can have an overcoating on a surface of the core. The overcoating can be a semiconductor material having a composition different from the composition of the core. The overcoat of a semiconductor material on a surface of the nanocrystal can include a Group II-VI compound, a Group II-V compound, a Group III-VI compound, a Group III-V compound, a Group IV-VI compound, a Group compound, a Group II-IV-VI compound, and a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, Pb Se, PbTe, $Cd_3As_2$, $Cd_3P_2$ or mixtures thereof. For example, ZnS, ZnSe or CdS overcoatings can be grown on CdSe or CdTe nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating can be between 1 and 10 monolayers thick.

Shells are formed on nanocrystals by introducing shell precursors at a temperature where material adds to the surface of existing nanocrystals but at which nucleation of new particles is rejected. In order to help suppress nucleation and anisotropic elaboration of the nanocrystals, selective ionic layer adhesion and reaction (SILAR) growth techniques can be applied. See, e.g., U.S. Pat. No. 7,767,260, which is incorporated by reference in its entirety. In the SILAR approach, metal and chalcogenide precursors are added separately, in an alternating fashion, in doses calculated to saturate the available binding sites on the nanocrystal surfaces, thus adding one-half monolayer with each dose. The goals of such an approach are to: (1) saturate available surface binding sites in each half-cycle in order to enforce isotropic shell growth; and (2) avoid the simultaneous presence of both precursors in solution so as to minimize the rate of homogenous nucleation of new nanoparticles of the shell material.

In the SILAR approach, it can be beneficial to select reagents that react cleanly and to completion at each step. In other words, the reagents selected should produce few or no reaction by-products, and substantially all of the reagent added should react to add shell material to the nanocrystals. Completion of the reaction can be favored by adding sub-stoichiometric amounts of the reagent. In other words, when less than one equivalent of the reagent is added, the likelihood of any unreacted starting material remaining is decreased.

The quality of core-shell nanocrystals produced (e.g., in terms of size monodispersity and QY) can be enhanced by using a constant and lower shell growth temperature. Alternatively, high temperatures may also be used. In addition, a low-temperature or room temperature "hold" step can be used during the synthesis or purification of core materials prior to shell growth.

The outer surface of the nanocrystal can include a layer of compounds derived from the coordinating agent used during the growth process. The surface can be modified by repeated exposure to an excess of a competing coordinating group to form an overlayer. For example, a dispersion of the capped nanocrystal can be treated with a coordinating organic compound, such as pyridine, to produce crystals which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal. Nanocrystal coordinating compounds are described, for example, in U.S. Pat. No. 6,251,303, which is incorporated by reference in its entirety.

A perovskite material can have the formula (I):

$$APbX_3 \tag{I}$$

where A is an organic or molecular cation (such as ammonium, methylammonium, formamidinium, phosphonium, cesium, etc.), and X is a halide ion (such as I, Br, or Cl).

Alternatively, a perovskite material can have the formula (II):

$$A_xA'_{1-x}B_yB'_{1-y}O_{3\pm\delta} \tag{II}$$

where each of A and A', independently, is a rare earth, alkaline earth metal, or alkali metal, x is in the range of 0 to 1, each of B and B', independently, is a transition metal, y is in the range of 0 to 1, and δ is in the range of 0 to 1. δ can represent the average number of oxygen-site vacancies (i.e., −δ) or surpluses (i.e., +δ); in some cases, δ is in the range of 0 to 0.5, 0 to 0.25, 0 to 0.15, 0 to 0.1, or 0 to 0.05. For clarity, it is noted that in formula (I), B and B' do not represent the element boron, but instead are symbols that each independently represent a transition metal. In some cases, δ can be approximately zero, i.e., the number of oxygen-site vacancies or surpluses is effectively zero. The material can in some cases have the formula $AB_yB'_{1-y}O_3$ (i.e., when x is 1 and δ is 0); $A_xA'_{1-x}BO_3$ (i.e., when y is 1 and δ is 0); or $ABO_3$ (i.e., when x is 1, y is 1 and δ is 0).

Rare earth metals include Pb, Hg, Sc, Y, La, Ce, Pr, Nd, Pm, Sm, Eu, Gd, Tb, Dy, Ho, Er, Tm, Yb, or Lu. Alkaline earth metals include Be, Mg, Ca, Sr, Ba, and Ra. Alkali metals include Li, Na, K, Rb, and Cs. Transition metals include Pb, Hg, Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, or Hg. Particularly useful alkaline earth metals can include Ca, Sr, and Ba. Particularly useful transition metals can include first-row transition metals, for example, Cr, Mn, Fe, Co, Ni, and Cu. Representative materials of formula (I) include calcium titanate ($CaTiO_3$), barium titanate ($BaTiO_3$), strontium titanate ($SrTiO_3$), barium ferrite ($BaFeO_3$), $KTaO_3$, $NaNbO_3$, $PbTiO_3$, $LaMnO_3$, $SrZrO_3$, $SrHfO_3$, $SrSnO_3$, $SrFeO_3$, $BaZrO_3$, $BaHfO_3$, $KNbO_3$, $BaSnO_3$, $EuTiO_3$, $RbTaO_3$, $GdFeO_3$, $PbHfO_3$, $LaCrO_3$, $PbZrO_3$, or $LiNbO_3$.

The dynamics of lead heavy metal capture within the chemical barrier film was studied in order to improve and simplify the manufacturing capability of the barrier. In these studies, it was discovered that the barrier film described herein captures lead faster than many commercial films—in roughly 1-8 hours depending on initial lead concentration and pH. Lead capture is better in acidic conditions that are most often seen in the environment. The studies also found that using a mixed solvent of 70% tert-butanol and 30% toluene, it is possible to simultaneously create an acrylic emulsion ink/paint system as well as quicken drying in air. All these developments are on a heterogeneous dispersion of calcium phosphate in an ion-exchange polymeric binder.

Through the experiments described herein, it was noticed that the amount of ion-permeable binder that is used effects both overall drying time as well as the ability for the film. There can be difficulty reducing the amount of binder due to the fact that a lower binder concentration reduces the inks viscosity thereby causing settling of the calcium phosphate active material. In addition, residual toluene can prevent ion exchange in a water based environment. With the original formulation, it was difficult to achieve high lead capture unless the films were dried the films under vacuum.

It was discovered that a mixture of 70% tert-butanol and 30% toluene, originally designed to allow for higher ion-exchange properties only partially dissolves the binder mixture at room temperature. However, with moderate heating to 60 C the binder completely dissolves. Therefore, with moderate heating and cooling the calcium phosphate particles can be coated with polymer binder thereby creating an emulsion, which does not settle. In addition, lower amounts of binder can be used (5-10% by weight), which improves atmospheric drying. Using this technique, it has been possible to capture solubilized lead similarly to the previous approaches with simpler and easier manufacturing.

Examples of heavy metal capture compositions and their effectiveness are described below.

Carboxylate Polymers for Lead Based Quantum Dots

In this example, carboxylate polymers can capture and contain heavy metals leached from devices with quantum dot components and prevent their release into the environment. The polymer may act as a laminate material in an encapsulation architecture for a quantum dot device, as depicted in FIGS. 1A-1E, or added separately to a quantum dot leachate solution to reduce the heavy metal concentration. Examples of heavy metal capture and containment by a carboxylate polymer for the case of lead from lead sulfide quantum dots and the polymer ethylene vinyl acetate (EVA) are shown in Table 1. The ion exchangeable material can be dissolved or dispersed in a matrix. A photo of a carboxylate polymer absorbing lead leached from a quantum dot film following an 18 hour acid extraction can be seen in FIGS. 3A-3C.

Lead Leaching

U.S. Environmental Protection Agency's Toxicity Characteristic Leaching Procedure can be followed to simulate lead leaching in a landfill setting. See, for example, United States Environmental Protection Agency. Public Meeting on Waste Leaching. In Proceedings of the Environmental Protection Agency; 1999; pp 1-44. (for TCLP simulates landfill setting) United States Environmental Protection Agency. Method 1311: Toxicity Characteristic Leaching Procedure. In *Final Update I to the Third Edition of the Test Methods for Evaluating Solid Waste, Physical/Chemical Methods;* 1992, which is incorporated by reference in its entirety, describing TCLP procedure.

Experimental Procedure Involves:

1) Particle size reduction to <1 cm
2) Extraction with acetic acid buffer solution (pH=4.98)
3) Filtration with 0.7 μm filter
4) Analysis using ICP-OES Experimental results follow in Table 1.

TABLE 1

| Extraction Contents | Leached Pb (ppm) | Leached Pb/ Total Pb Available |
|---|---|---|
| PbS Quantum Dots on Glass Substrate | 10.9 ± 0.3 | 33% |
| PbS Quantum Dots on Glass Substrate with EVA laminate and top glass Architecture left in tact | 0.4 ± 0.1 | 3% |
| PbS Quantum Dots on Glass Substrate with EVA laminate and top glass Architecture broken into fragments <1 cm in widest dimension | 2.4 ± 0.1 | 19% |
| PbS Quantum Dots on Glass Substrate with strips of EVA added into the solution | 3.4 ± 0.6 | 20% |

In the examples of Table 1, examples of extractions performed with PbS quantum dots and the carboxylate polymer ethylene vinyl acetate (EVA). Extractions were performed in acetic acid buffer solution for 18±2 hours in accordance with the U.S. Environmental Protection Agency's toxicity characteristic leaching procedure. The total available lead was determined by performing ultra wave digestions of samples prepared identically to those extracted.

Figure 3A:
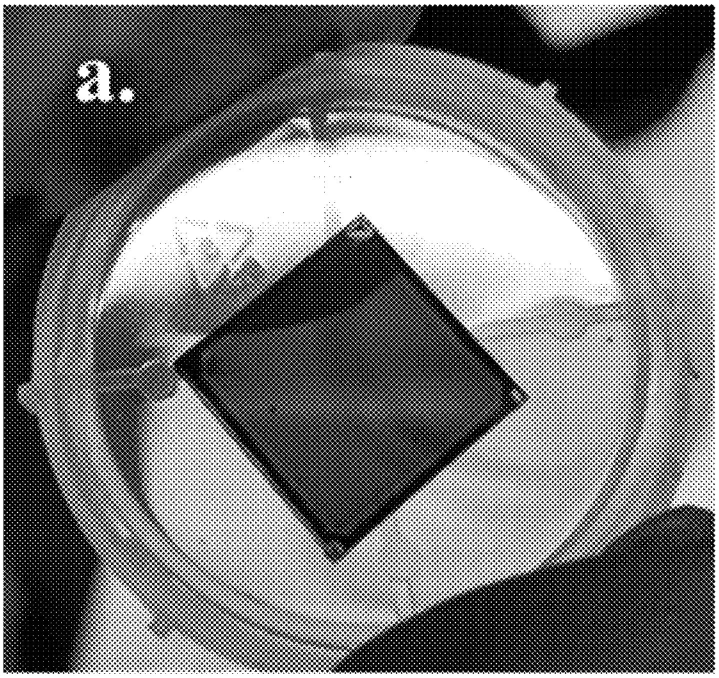
FIGS. 3A-3C shows an exemplary extraction experiment.
Figure 3B:
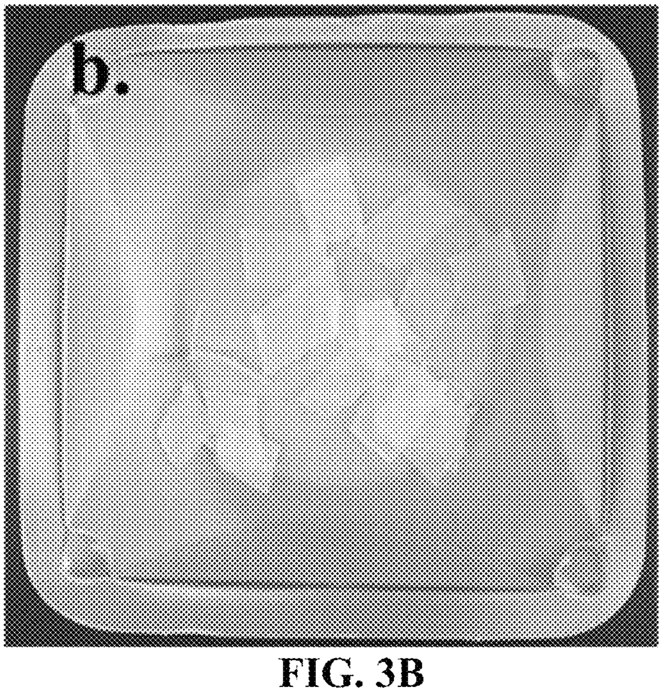
Figure 3C:
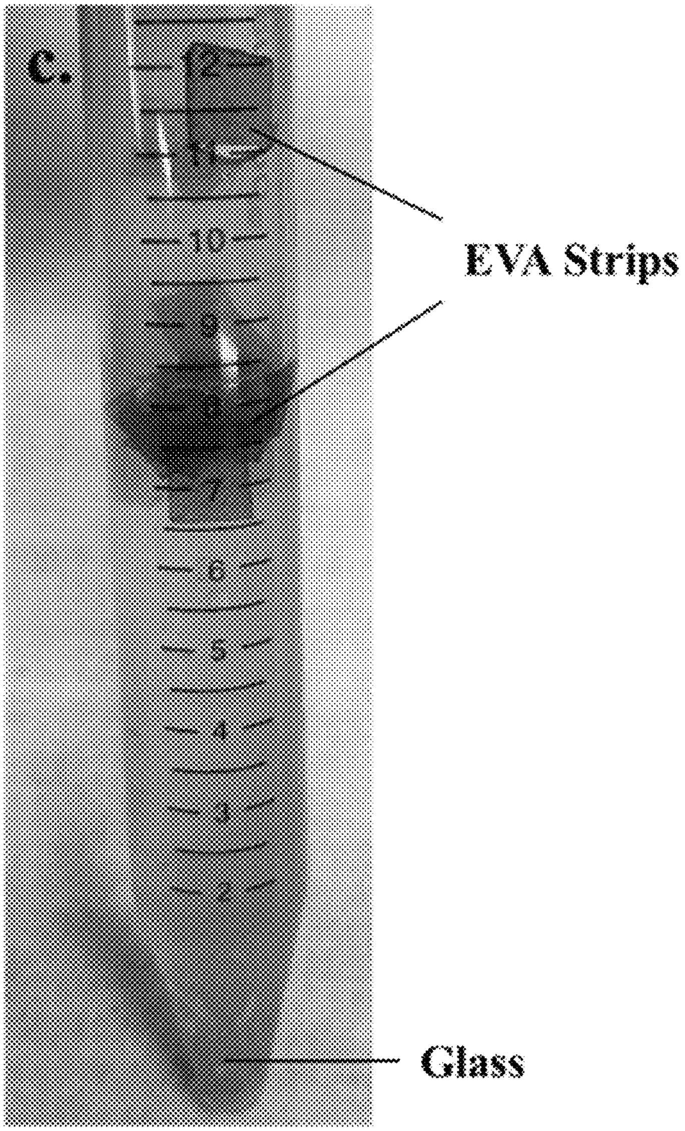

Results of leaching experiments can be observed visually. FIGS. 3A-3C is a photo of a PbS quantum dot film on a glass substrate prior to extraction. FIG. 3A is a photo of strips of the carboxylate polymer ethylene vinyl acetate (EVA) prior to extraction. FIG. 3B is a photo of an extraction of a PbS quantum dot film on glass and EVA strips after 18±2 hours in acetic acid buffer solution. The color change of the EVA strips from colorless to brown indicates the absorption of leached lead from the quantum dots.

Phosphate Salt for Lead-Based Perovskites

In the examples described above, phosphate salts interact with aqueous lead released from the degradation of perovskite materials and form a precipitate that can be encapsulated or filtered out of solution. As exemplified herein, calcium phosphate decreases the lead levels below the EPA 5 ppm limit.

Silicate Salt for Lead-Based Perovskites

Figure 4A:
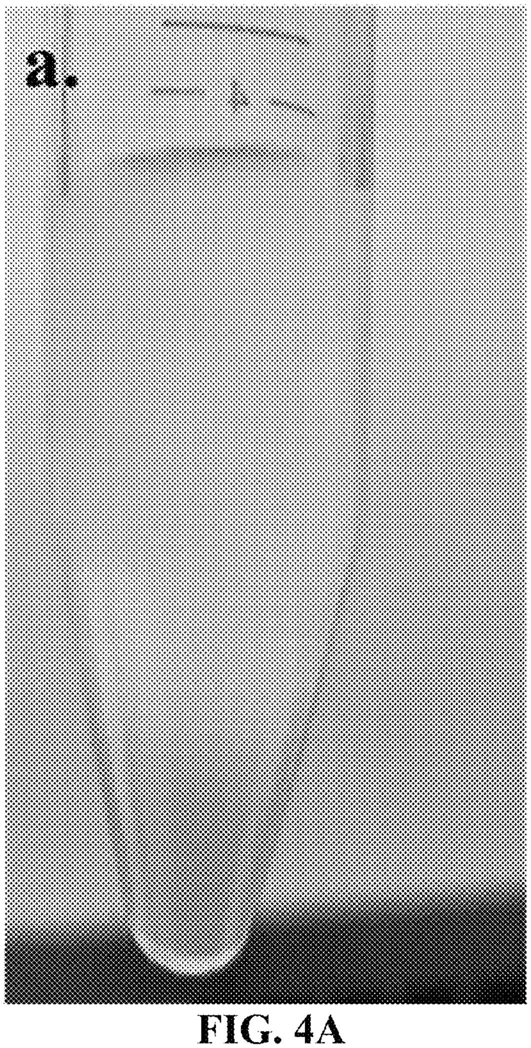
FIG. 4A is a photo of a precipitate formed following the extraction of $PbI_2$ and $Na_2SiO_3$ in acetic acid buffer solution.
Figure 4B:
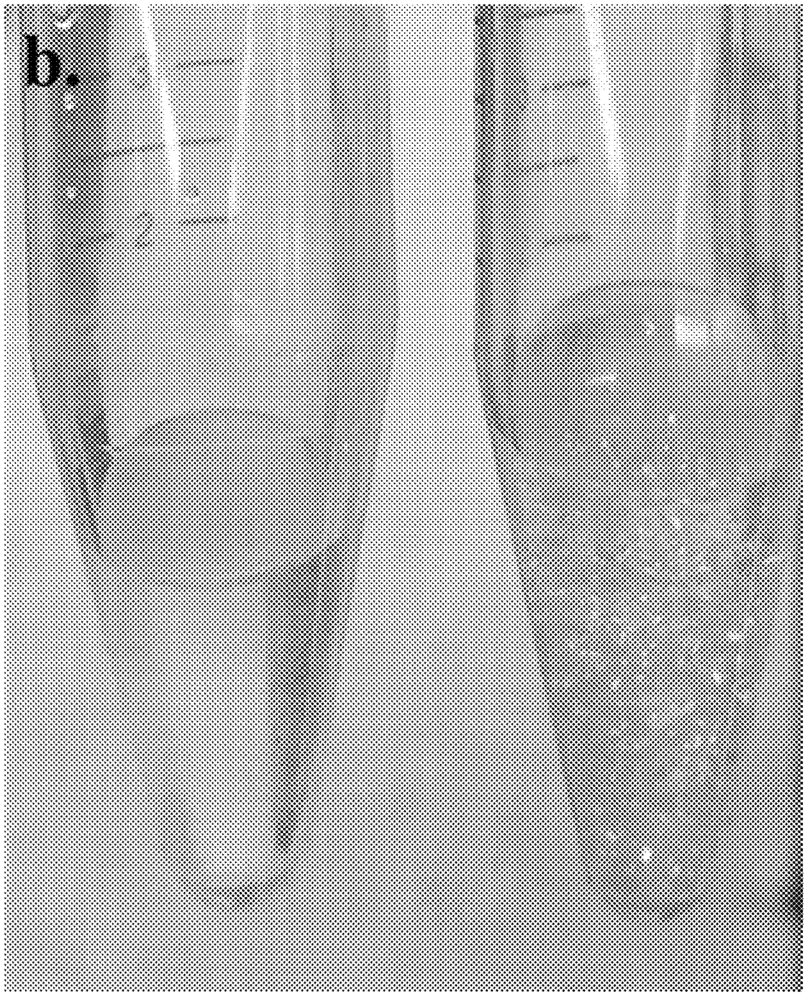
FIG. 4B is a photo of the supernatant solution following acetic acid buffer solution of (left) the solution pictured in FIG. 4A and (right) a control solution of $PbI_2$ extracted without $Na_2SiO_3$. The formation of yellow crystals in the right solution indicates that a high concentration of $PbI_2$ remains in solution, while the lack of crystals in the left solution reveals that $PbI_2$ has been successfully removed by filtering out the precipitate.
Figure 5:
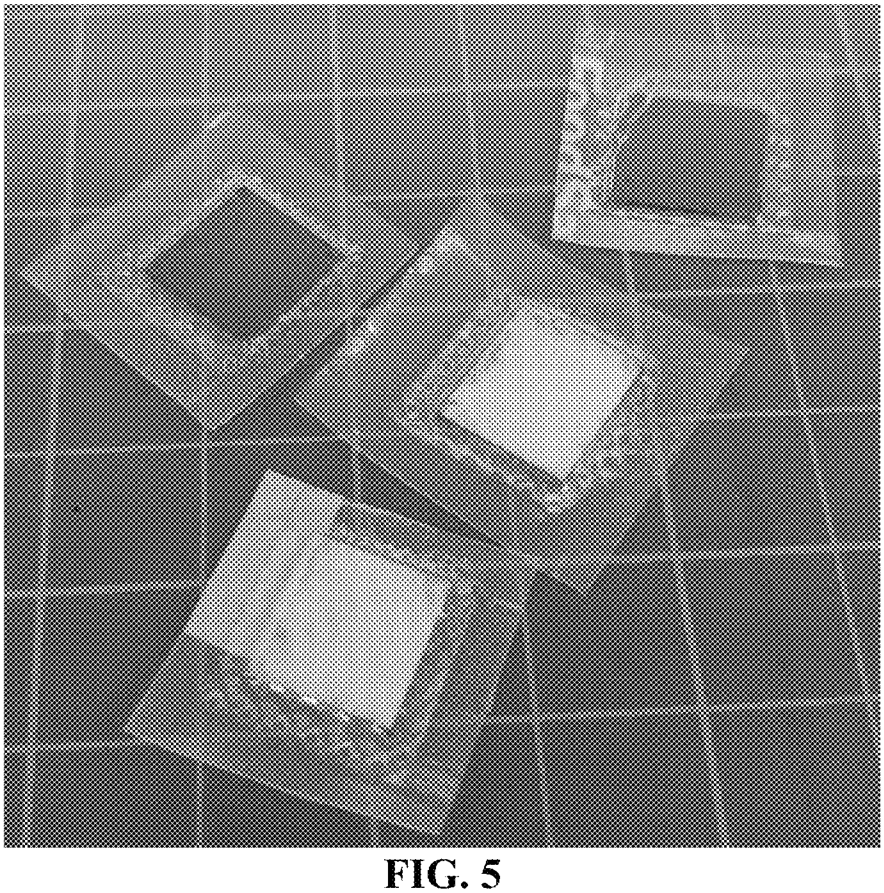
FIG. 5 is a photo of (top) two control perovskite films with barrier film encapsulation and (bottom) two perovskite films topped with silicate salt with barrier film encapsulation. The addition of silicate salt into the encapsulation architecture reduces the amount of leached lead following barrier film perforation by 38%.

In this example, silicate salts interact with aqueous lead released from the degradation of perovskite materials and form a precipitate that can be encapsulated or filtered out of solution. FIGS. 4A-4B show a photo of the formation of a precipitate when both $PbI_2$, a chemical released from the degradation of lead-based perovskites in aqueous solution, and the silicate salt $Na_2SiO_3$ or $KSiO_3$ are extracted together in acetic acid buffer solution. FIG. 4B also compares this extraction fluid following filtration of the supernatant solution to a control solution of $PbI_2$ without silicates added, demonstrating the removal of lead from the solution by filtering out the precipitate. FIG. 5 demonstrates the incorporation of silicate salt into a perovskite device architecture to mitigate the release of lead into the environment.

Silicate salts provide a promising path forward for perovskite barrier films, reducing leached lead for $MAPbI_3$ films by 38%, but further work is needed for compliance with the EPA limit of 5 ppm leached lead Sulfur Salts for Lead-Based Perovskites In this example, sulfide salts interact with aqueous lead released from perovskite materials and precipitate as Lead Sulfide. Lead sulfide can then be flocculated using carboxylate materials as demonstrated above, by the binder polymer, or naturally. Lead sulfide, due to its extremely low solubility in water as well as being one of the most inert salt forms of most heavy metals, therefore captures the majority of leached lead. The sulfide salt source can either be organic such as Polyanetholesulfonic acid sodium salt, or inorganic such as Iron Sulfide.

Perovskite Substrate and Lead Recycling

Figure 6:
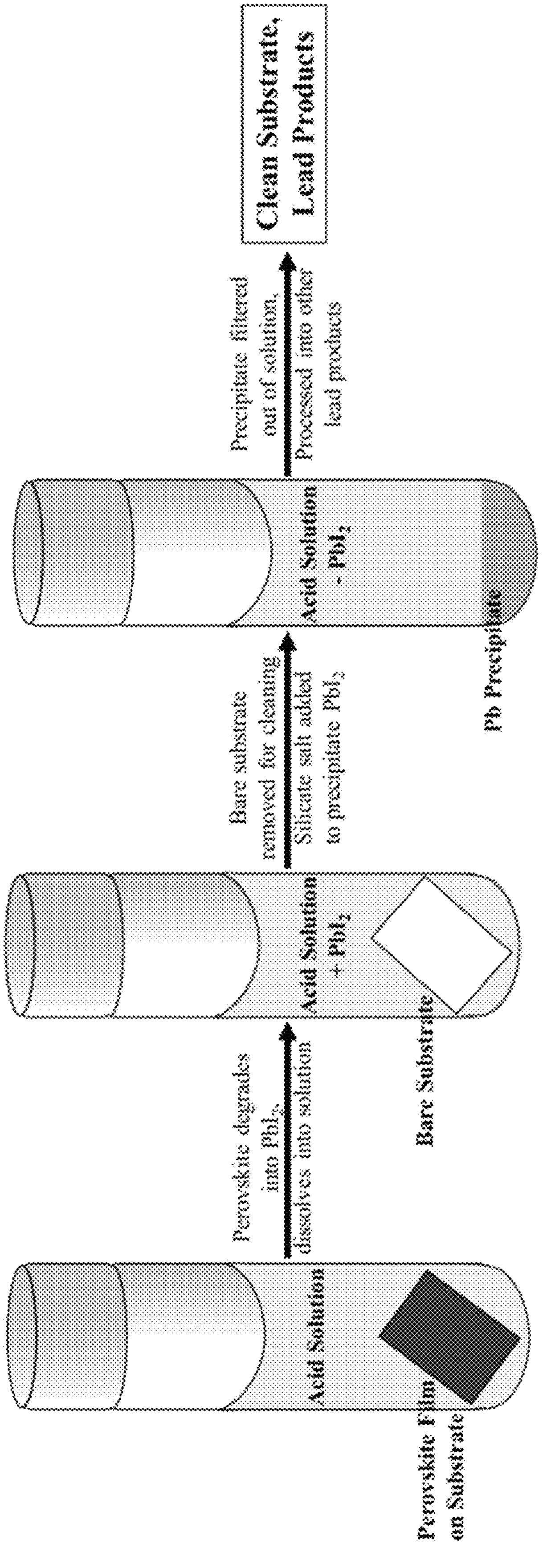
FIG. 6 is a schematic is shown of lead and substrate recycling for a perovskite device.
Figure 7A:
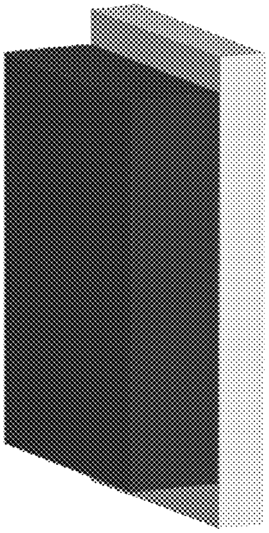
FIGS. 7A-7D are schematics of a landfill disposal simulation.
Figure 7B:
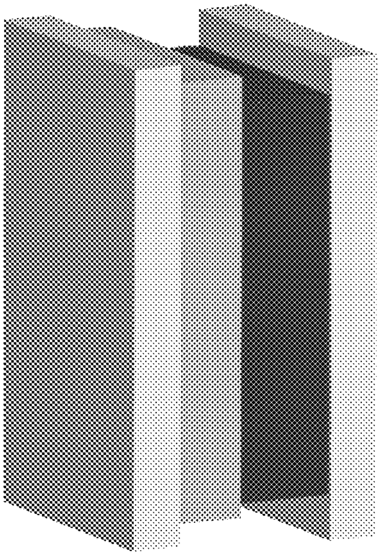
Figure 7C:
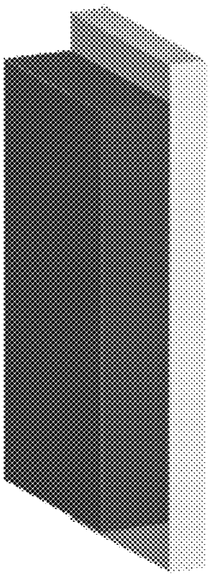
Figure 7D:
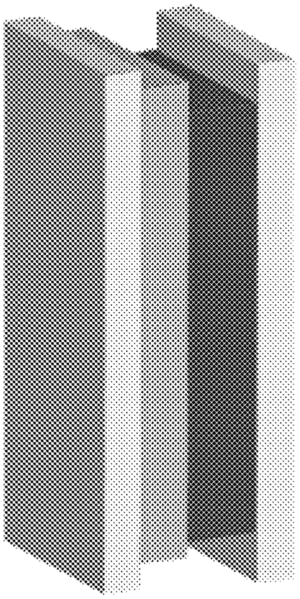

In this example, it is shown that it is possible to recycle substrates and lead from decommissioned perovskite devices by further processing the precipitate resulting from the combination of $PbI_2$ and silicate salt. The perovskite layer is first removed from the substrate by acid washing. The substrate can then be removed from the solution and cleaned for reuse. The lead is then recovered from the solution via precipitation from the addition of silicate salt, similar to what has been demonstrated. Once the precipitate has been filtered out of solution, it can be processed into other lead products. A schematic of this process is shown in FIG. 6.

Device Encapsulation

Traditional glass/EVA/glass encapsulation architecture reduces the amount of leached lead for PbS QD PV devices enough to comply with the EPA limit of 5 ppm leached lead for landfill disposal FIGS. 7A-7D.

This same glass/EVA/glass encapsulation architecture fails to significantly reduce the amount of leached Pb for $MAPbI_3$ perovskite devices, however other compositions including a silicate, sulfide or other ion exchange material is expected to reduce leaching from a perovskite-based device.

The ion-exchange dynamics of the barrier film were studied. In general, the film captures solubilized lead to below toxicity standards under a wide range of concentration conditions. The film also preforms better in acidic conditions normally present in soil conditions where most lead compounds are most soluble. Lastly, the lead source has shown to not affect the barrier capture ability.

Figure 9A:
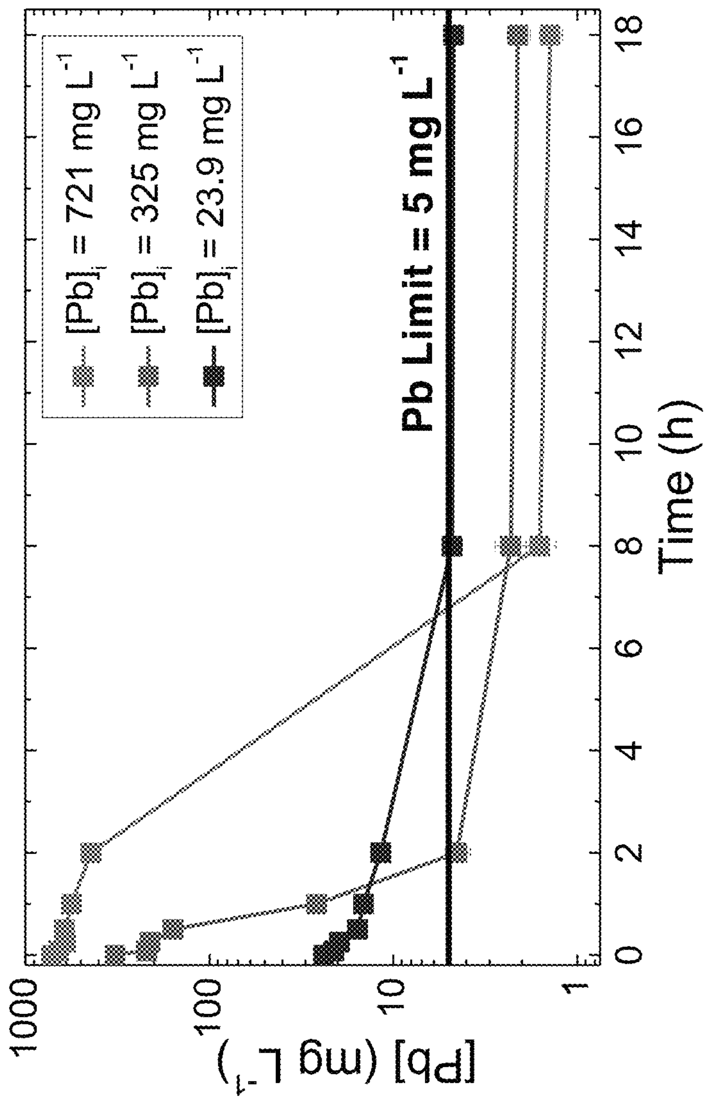
FIGS. 9A-9B show graphs depicting lead capture at different initial lead concentrations.
Figure 9B:
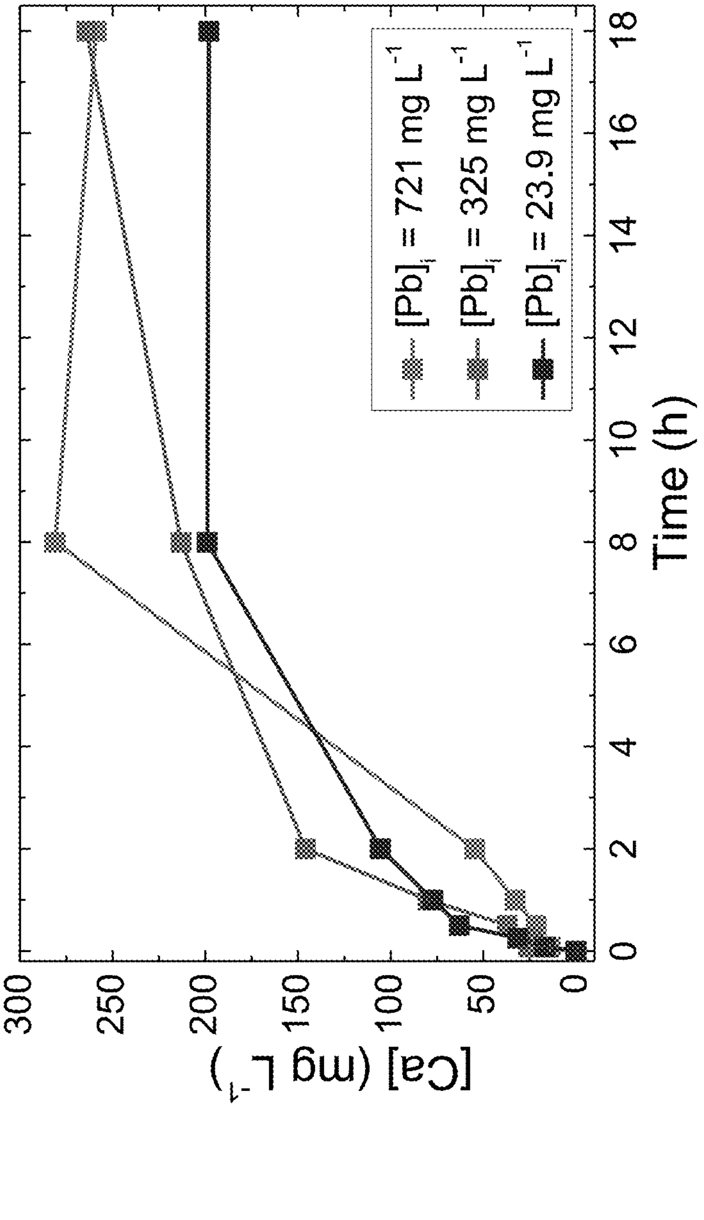

Referring to FIGS. 9A and 9B, barrier film lead capture with varied initial concentration of lead is shown. FIG. 9A shows concentration of Pb and FIG. 9B shows concentration of Ca over 18 h extraction of barrier film and TCLP extraction fluid with varied concentrations of dissolved Pb. Data are represented as mean±standard deviation.

Figure 10A:
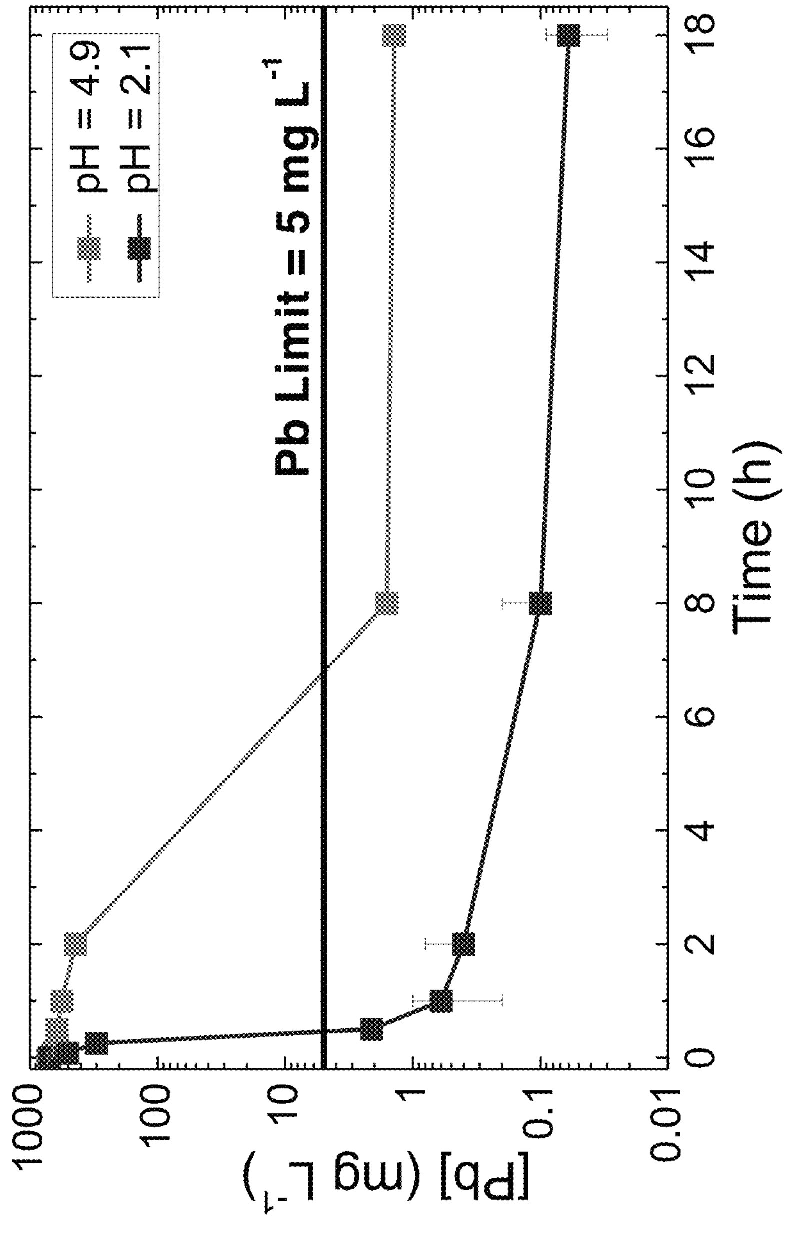
FIGS. 10A-10D show graphs depicting lead capture at different pH conditions.
Figure 10B:
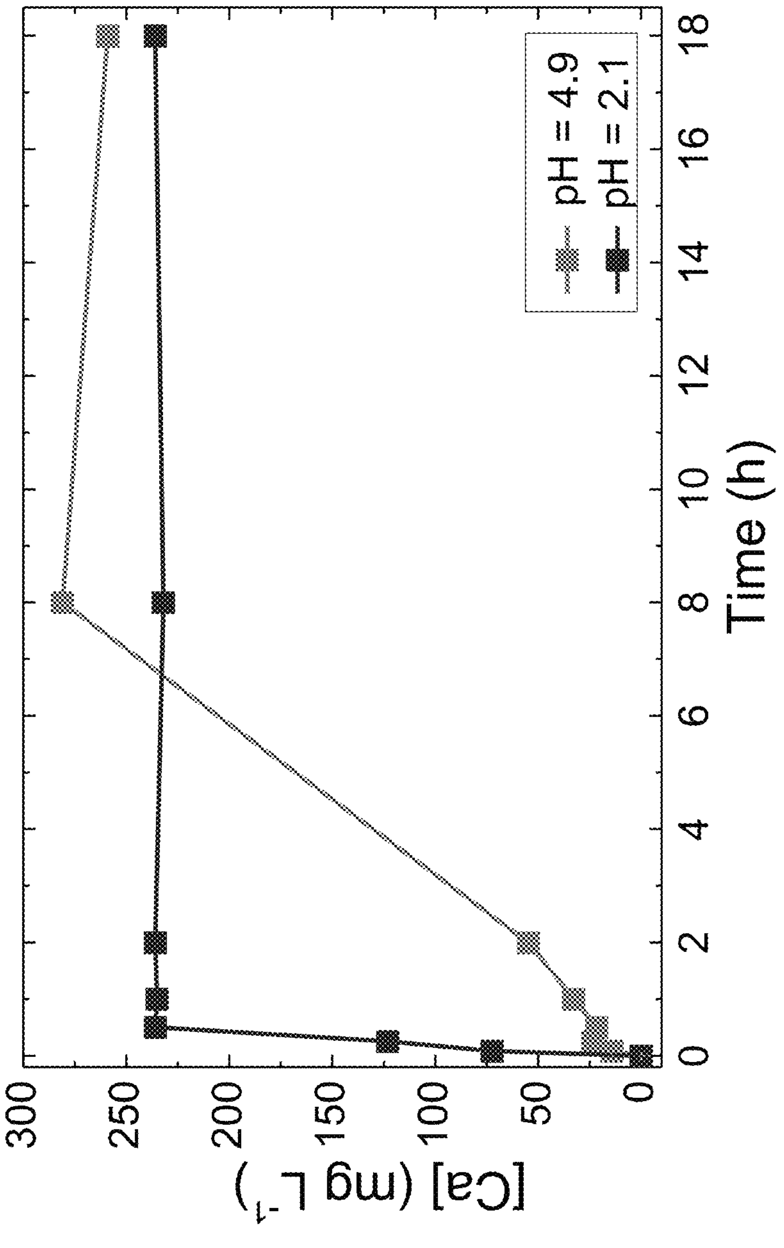
Figure 10C:
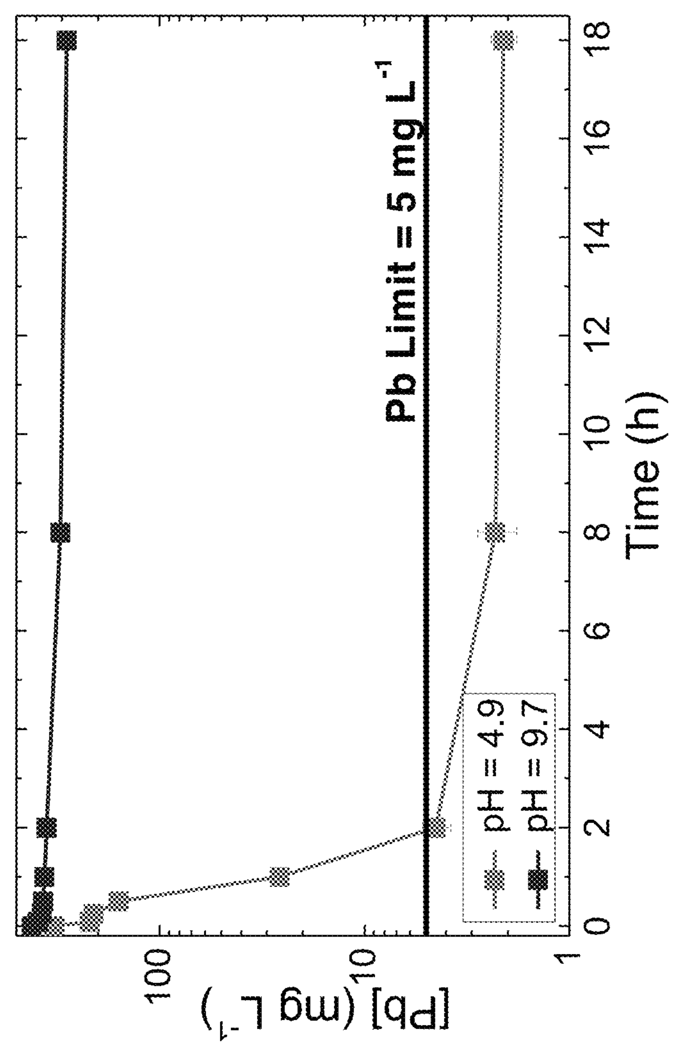
Figure 10D:
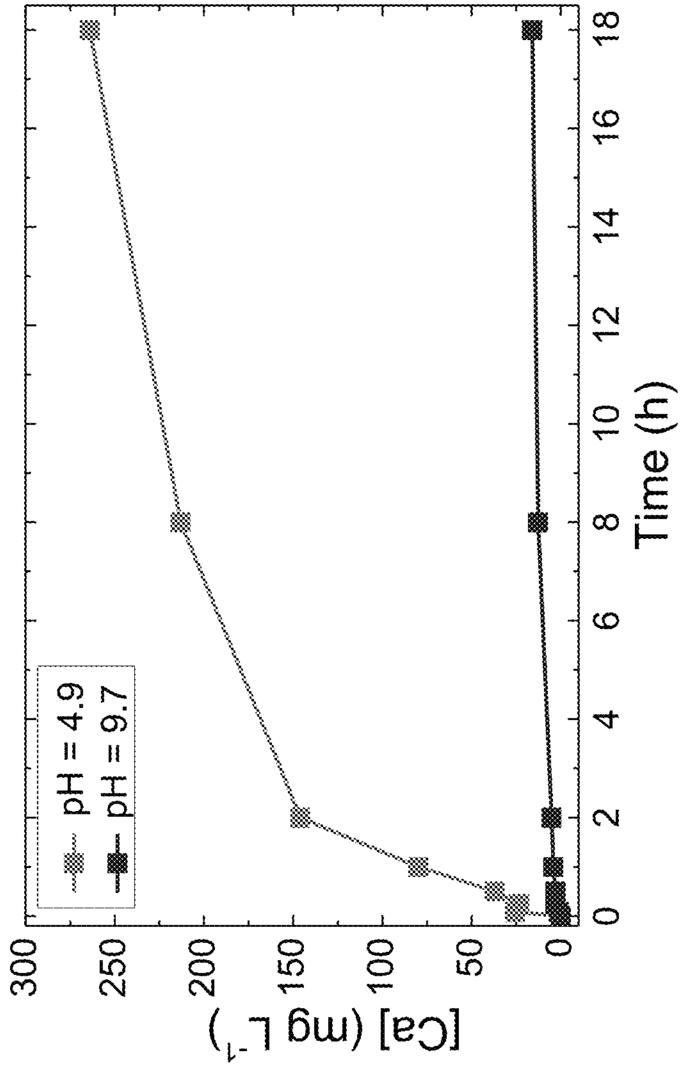

Referring to FIGS. 10A and 10B, barrier film lead capture at different pH values is shown. FIG. 10A shows the concentration of Pb and FIG. 10B shows the concentration of Ca over 18 h extraction of barrier film and pH 4.9 or pH 2.1 extraction fluid. FIG. 10C shows the concentration of Pb and FIG. 10D shows the concentration of Ca over 18 h extraction of barrier film and pH 4.9 or pH 9.7 extraction fluid. Data are represented as mean±standard deviation.

Figure 11A:
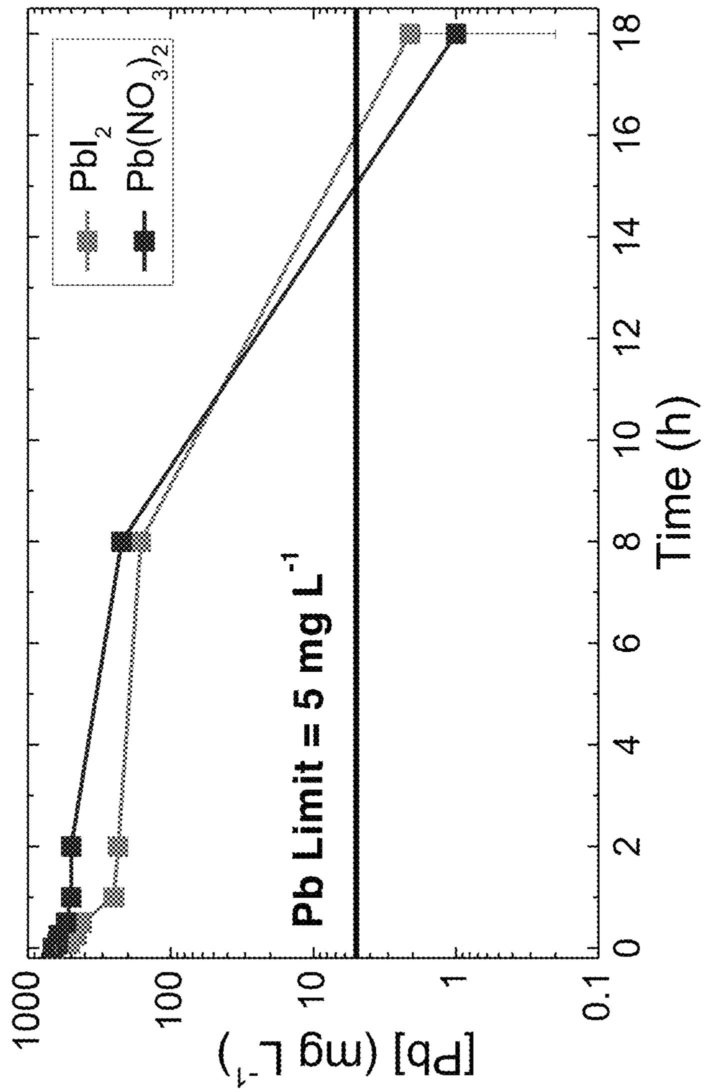
FIGS. 11A-11B show graphs depicting lead capture with different lead compounds.
Figure 11B:
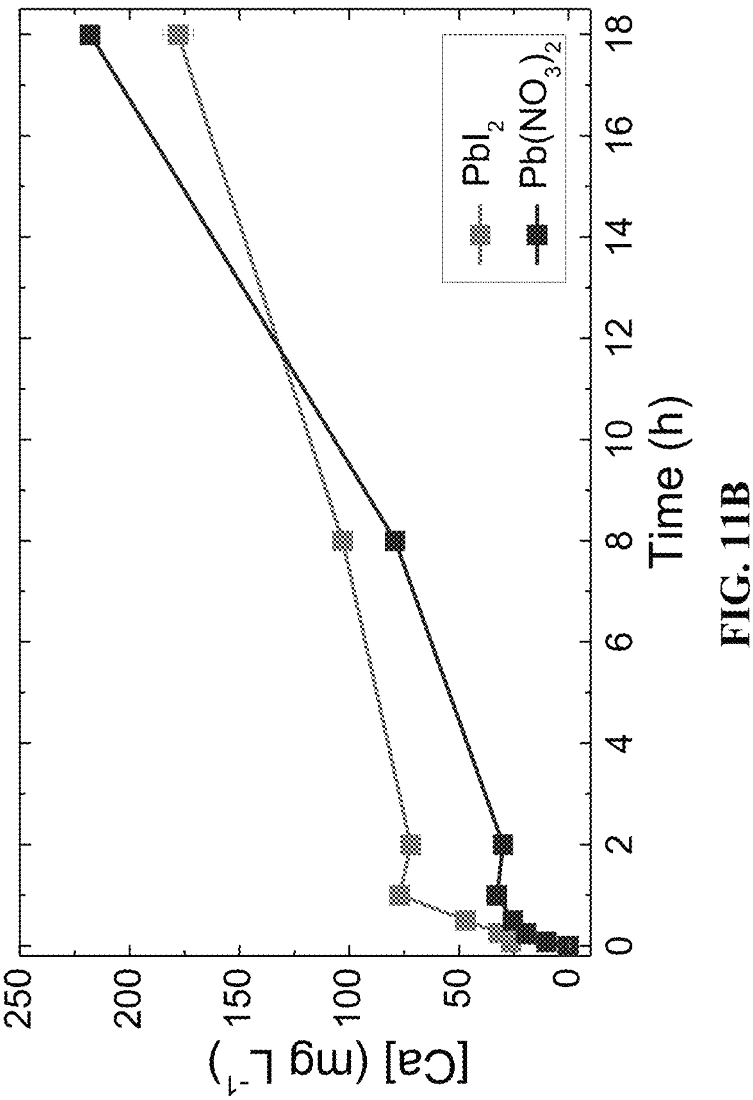

Referring to FIGS. 11A and 11B, barrier film lead capture with different lead compounds is shown. FIG. 11A shows the concentration of Pb and FIG. 11B shows the concentration of Ca over 18 h extraction of barrier film TCLP extraction fluid with dissolved $PbI_2$ or $Pb(NO_3)_2$. Data are represented as mean±standard deviation.

Figure 12:
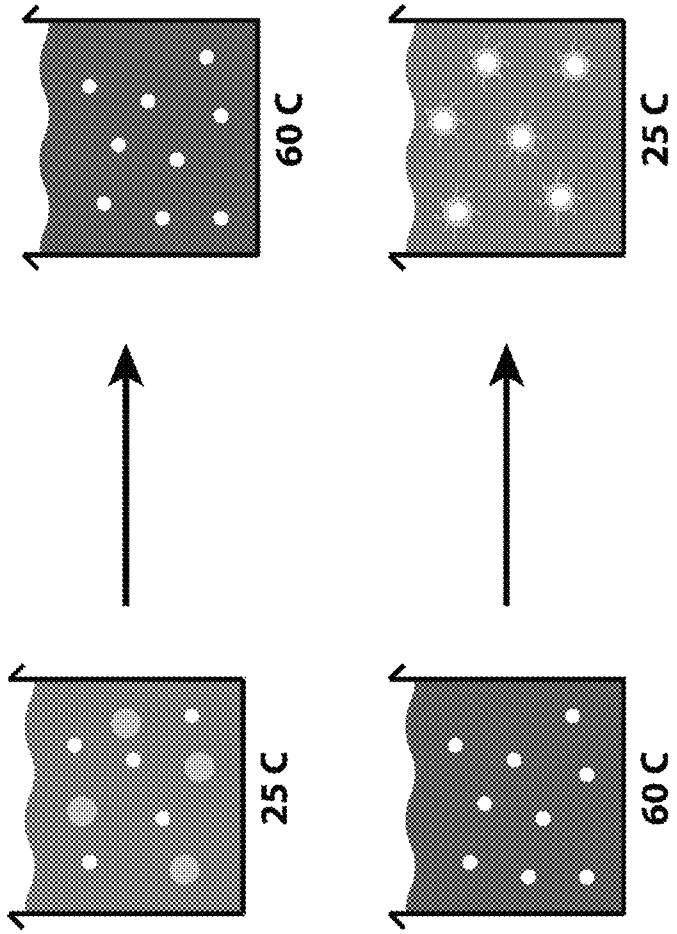
FIG. 12 shows a schematic for creating a barrier film emulsion.

FIG. 12 shows a schematic for creating a barrier film emulsion. Increasing the temperature of the suspension to about 60 C and then decreasing the suspension temperature to room temperature facilitates the formation of a barrier film emulsion.

Figure 13:
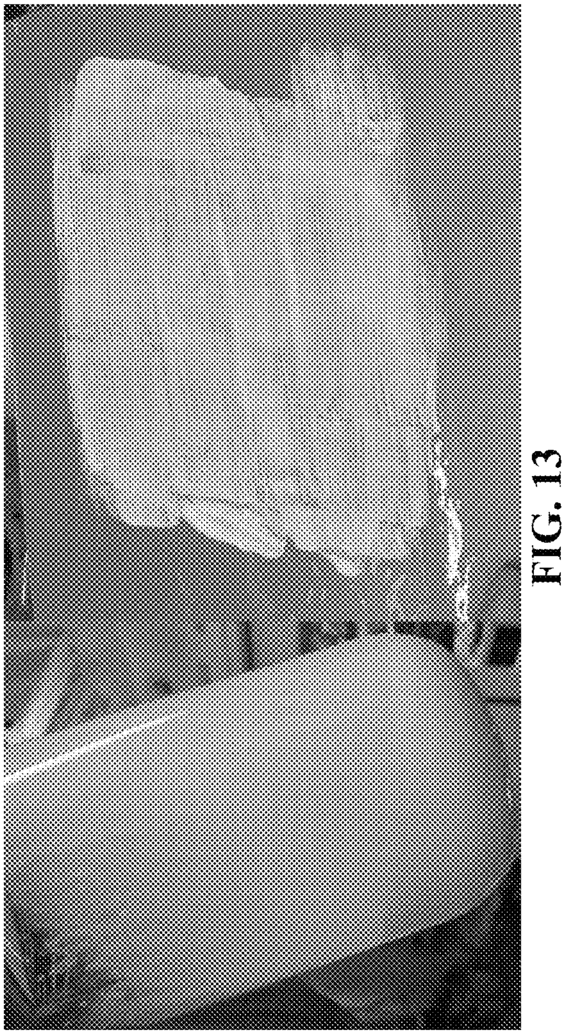
FIG. 13 shows a barrier film ink and a film painted on a substrate.

FIG. 13 shows a barrier film ink and a film painted on a substrate. The emulsion from FIG. 12 can be deposited on a surface as a paint or other coating.

A device including the barrier film can be purposefully damaged and the ion exchange film extracted. The film can then be acid washed to recycle the lead that was captured in the barrier film making the film useful for recycling processes.

EXAMPLES

Synthesis of Colloidal PbS QDs.

The synthesis of oleic-acid-capped PbS QD with a first absorption peak at λ=956 nm was adapted from the literature. See, for example, C.-H. M. Chuang, P. R. Brown, V. Bulović, M. G. Bawendi, Nat. Mater. 2014, 13, 796. Zhao, N. et al. Colloidal PbS quantum dot solar cells with high fill factor. ACS Nano 4, 3743-3752 (2010). Hines, M. A. & Scholes, G. D. Colloidal PbS nanocrystals with size-tunable near-infrared emission: Observation of post-synthesis self-narrowing of the particle size distribution. Adv. Mater. 15, 1844-1849 (2003), which is incorporated by reference in its entirety. Lead acetate (11.38 g) was dissolved in 21 ml of oleic acid and 300 ml of 1-octadecene at 100° C. The solution was degassed overnight and then heated to 150° C. under nitrogen. The sulphur precursor was prepared separately by mixing 3.15 ml of hexamethyldisilathiane and 150 ml of 1-octadecene. The reaction was initiated by rapid injection of the sulphur precursor into the lead precursor solution. After synthesis, the solution was transferred into a nitrogen-filled glovebox. QDs were purified by adding a mixture of methanol and butanol, followed by centrifugation. The extracted QDs were re-dispersed in hexane and stored in the glovebox. For device fabrication, PbS QDs were further precipitated twice with a mixture of butanol/ethanol and acetone, respectively, and then re-dispersed in octane (60 mg $ml^{-1}$).

Ligand Exchange of Colloidal PbS QDs.

PbS CQDs synthesized as above were used. The tetrabutyl ammonium iodide (TBAI) solution-phase ligand-exchange process was carried out in a glass vial in air. 360 mg of TBAI was dissolved in 1.8 mL of ethanol. A 2.08 mL amount of PbS QDs (60 mg $mL^{-1}$) was then added to the TBAI solution. The vial was mixed vigorously for 30 s and then centrifuged to form a pellet of PbS QDs. The QDs were then resuspended in 2 mL of dimethyl formamide (DMF) and re-precipitated with 6 mL of ethanol, centrifuging to form a pellet. After 5 min of drying, the PbS QDs were then redispersed in DMF (400 mg $ml^{-1}$) to achieve ligand-exchanged PbS QD ink.

Synthesis of ZnO Nanoparticles.

ZnO nanoparticles were synthesized according to the literature. See, for example, C.-H. M. Chuang, P. R. Brown, V. Bulović, M. G. Bawendi, Nat. Mater. 2014, 13, 796. Beek, W. J. E., Wienk, M. M., Kemerink, M., Yang, X. & Janssen, R. A. J. Hybrid zinc oxide conjugated polymer bulk heterojunction solar cells. J. Phys. Chem. B 109, 9505-9516 (2005), which is incorporated by reference in its entirety. Zinc acetate dihydrate (2.95 g) was dissolved in 125 ml of methanol at 60° C. Potassium hydroxide (1.48 g) was dissolved in 65 ml of methanol. The potassium hydroxide solution was slowly added to the zinc acetate solution and the solution was kept stirring at 60° C. for 2.75 h. ZnO nanocrystals were extracted by centrifugation and then washed twice by methanol followed by centrifugation. Finally, 10 ml of chloroform was added to the precipitates and the solution was filtered with a 0.10 micron filter.

PbS QD PV Device Fabrication:

Patterned ITO glass substrates (Thin Film Device Inc.) were cleaned with solvents and then treated with oxygen plasma. ZnO layers (120 nm) were fabricated by spin-coating a solution of ZnO nanoparticles onto ITO substrates and annealing at 165° C. for 10 min. The ligand-exchanged PbS QD ink was deposited by single-step spin-coating at 1,000 r.p.m. for 60 s and then annealing at 75° C. for 15 min, achieving a layer thickness of ~450 nm. PbS QD hole transport layers were fabricated by layer-by-layer spin-coating. For each layer, ~15 μl of PbS solution (diluted to a concentration of 50 mg ml-1) was spin-cast onto the substrate at 2,500 rpm for 30 s. A 1,2-ethane dithiol (EDT) solution (0.02 vol % in acetonitrile) was then applied to the substrate for 30 s, followed by three rinse-spin steps with acetonitrile. The layer-by-layer spincoating process was repeated twice to achieve to achieve a total PbS-EDT film thickness of ~45 nm. All the spin-coating steps were performed under ambient conditions and room light at room temperature. The films were stored in air and then transferred to a nitrogen-filled glovebox for electrode evaporation. Au electrodes (100 nm thick) were thermally evaporated onto the films through shadow masks at a base pressure of 10-6 mbar. The nominal device areas are defined by the overlap of the anode and cathode to be 5.44 $mm^2$.

Single Barrier Layer Dispersion.

A dispersion of silicate or sulfide in was created in an anhydrous solvent. The inorganic material was ground in a material grinder. The grinder can be a nutria-bullet, a ball mill, or a 3 roll mill. The powder was then filtered through a 325 mesh (40 um) filter. The particles were around 1-5 um so that the ink doesn't settle out as fast. About 1% wt fumed silica was added to avoid aggregation and to keep everything as a powder.

The polymer binder was dissolved in an anhydrous solvent (toluene because toluene doesn't have much effect on a lead perovskite layer). Toluene can be used to azeotropically dry the polymer binder using a dean stark trap or similar apparatus. Some polymers require use of Toluene and THF, for example, PVDC or PVDF. In general polymers are selected to be soluble in toluene but also water.

After the polymer is dissolved, the powder was stirred overnight. Usually the polymer to inorganic is 5% to 50% wt. The viscosity can be optimized in order for the final inks to be blade coated or slot die coated. Sometimes, the materials can be hot pressed (50-70 C) for the ink to flow. Many of the inks were spin coated onto samples.

Perovskite Ink and Film Fabrication:

Lead Iodide (Alfa 99.9985%) was mixed stoichiometrically with Methylammonium Iodide (Great Cell Solar 99%). For a 5 mL solution this corresponded to 1.15 g PbI (0.5 mol) and 0.4 g MAI (0.5 mol). Typically, Methylammonium Chloride (Deynamo 99%) was added as a dopant in a 15% by mol excess (0.025 g). The powders were then dissolved in Tetrahydrofuran and 2M Methylamine (2.5 mL) and allowed to fully dissolve before adding 2.5 mL of Acetonitrile. A second synthesis utilized 50:50 THF and Methanol to replace Acetonitrile. A third synthesis utilized Isopropylamine at 0.5M instead of Methylamine.

Films were made by spin coating 200 uL of solution on a 1" glass substrate at 2000 rpm for 1 minute with a ramp up of 2000 rpm/s. Films were heat treated at 100 C for 30 minutes. Films were ~300 nm thick.

Copper Thiocyanate Ink and Film:

Copper Thiocyanate (Sigma 99.9%) was dissolved in a mixture of acetone and isopropylamine (7:1 by volume). Film were spin coated at 3000 pm for 1 minute at 3000 rpm/s ramp up. Films were heat treated at 120 C for 10 minutes. Films were ~60 nm thick.

Pedott:PSS Ink and Film:

Pedott:PSS was purchased from Ossila. (Al 4083). Film were spin coated at 3000 pm for 1 minute at 3000 rpm/s ramp up. Films were heat treated at 120 C for 10 minutes. Films were ~40 nm thick.

PCBM Ink and Film:

PCBM was purchased from Nano-C and dissolved at 30 mg/mL in chlorobenzene at 55 C. Ink was spin coated at 55 C at 1500 rpm at 1500 rpm/s for 1 minute. Films were ~40 nm thick.

BCP Ink and Film:

BCP was purchased form Lumtec and dissolved in Ethanol at 0.4 mg/mL. Films were spin coated at 7000 rpm at 7000 rpm/s for 10 seconds. Films were a monolayer.

Devices

Devices were created by washing ITO or FTO and then depositing Pedott:PSS, Perovskite, PCBM, and BCP in that order. Silver (100 nm) was then deposited as a back electrode at 0.1-2 angstroms/second.

A second device structure was created by washing ITO or FTO and then depositing Copper Thiocyanate, Perovskite, PCBM, and BCP in that order. Silver (100 nm) was then deposited as a back electrode at 0.1-2 angstroms/second.

Lead (Pb) halide perovskite photovoltaics (PVs) show potential as a low-cost source of renewable solar energy. However, the solubility of Pb in perovskite thin films threatens the commercial viability of perovskite PVs, as it could necessitate expensive hazardous waste disposal, and poses a risk of public Pb exposure in the event of catastrophic failure of PV encapsulation. A chemical barrier film capable of capturing and containing leached Pb, thereby preventing its release into the surrounding environment is presented. The barrier film, based on inexpensive, non-toxic polymers and calcium phosphate, is able to reduce Pb leaching of perovskite films below the United States Resource Conservation and Recovery Act hazardous waste limit and reduce the risk of Pb exposure from landfilled perovskite modules by three orders of magnitude. In addition to demonstrating successful Pb capture from aqueous solution, the barrier film exhibits promising robustness against physical and chemical degradation and could be used to recycle captured Pb into new compounds.

Figure 14:
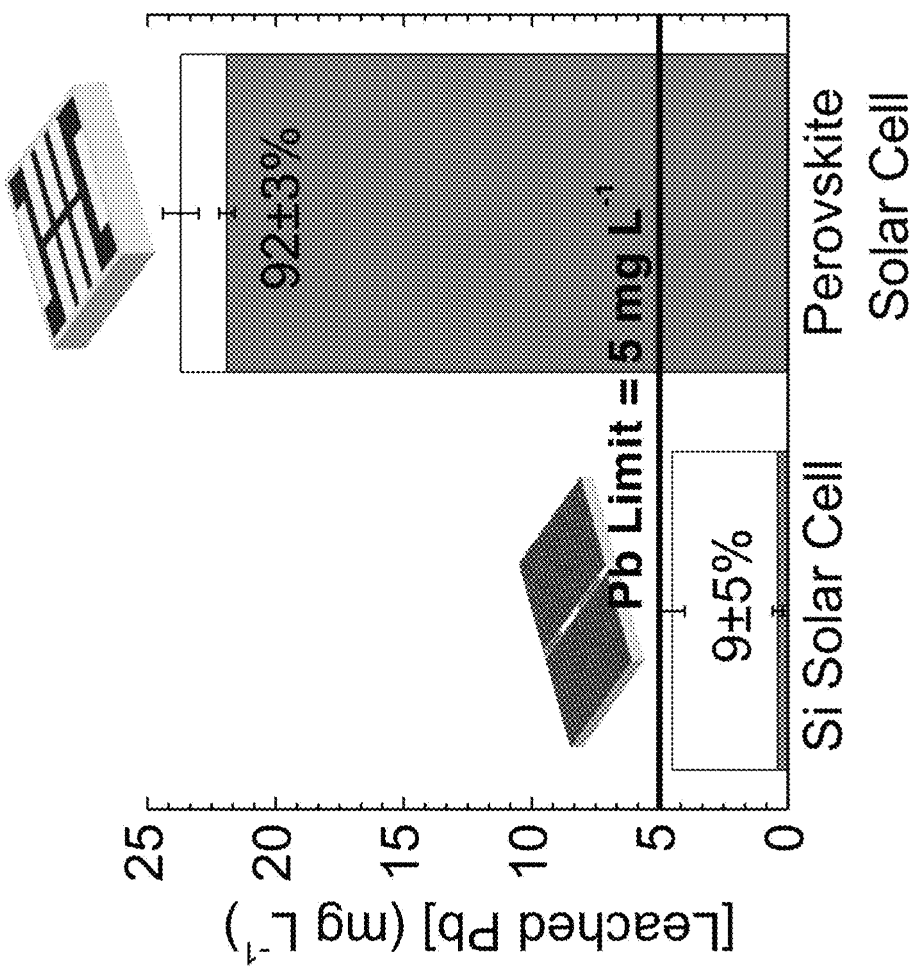
FIG. 14 shows Pb leaching comparison of Si and perovskite solar cells.

Lead halide perovskites have the potential to produce dramatic progress towards low solar levelized costs of electricity (LCOE). Their solution-processability and compatibility with flexible substrates could allow for low-cost, high-throughput production with lower CAPEX costs relative to crystalline silicon PV, as well as deployment in new and underserved markets. While rapid advancements in the performance of metal organic perovskite PV devices have achieved, with demonstrated power conversion efficiencies that exceed 25% and stable operation over thousands of hours, it has been found that when performing regulatory assessment on unencapsulated lab-scale solar cells that that while polycrystalline silicon cells do not exceed the United States Resource Conservation and Recovery Act (RCRA) hazardous waste limit for lead (Pb) and could be disposed of using municipal waste streams, perovskite solar cells do exceed the limit, and would thus require hazardous waste disposal, as shown in FIG. 14. Based on the U.S. Environmental Protection Agency's Pollution Prevention (P2) Cost Calculator, this hazardous waste disposal costs $1.50 on average per pound of waste. For a for a 15% power conversion efficient solar panel with 3 mm thick front and back glass encapsulation, this would add an additional $0.33 Wp-1 onto the cost of the module just for disposal. In contrast, nonhazardous municipal waste disposal would be $0.02 lb-1 or $0.004 W-1 for the same panel (75 times lower cost).

Referring to FIG. 14, TCLP Pb leaching analysis is performed on a lab-scale polycrystalline Si solar cell and a perovskite solar cell with architecture Glass/ITO/PEDOT:PSS/$CH_3NH_3PbI_3$ ($MAPbI_3$)/PCBM/BCP/Ag. The gray portions of each bar chart represent leached Pb, while the white portions represent total available Pb. Data are represented as mean±standard deviation. The Si solar cell has a lower total Pb content, a lower percentage of leached Pb, and unlike the perovskite solar cell, leaches less Pb than the RCRA hazardous waste limit and thus would not require hazardous waste disposal.

Pb Concentration Dependence

To test the efficacy of the barrier film at removing $Pb^{2+}$ ions from solution under catastrophic failure conditions of perovskite PVs, one can use solutions of $PbI_2$ in TCLP extraction fluid. $PbI_2$ is the Pb compound formed when Pb halide perovskite decomposes in aqueous solution, and TCLP extraction fluid has a high potential for Pb extraction and is legally required for hazardous waste evaluation in the United States. In an example, one can first prepare a saturated solution of $PbI_2$ in TCLP extraction fluid, and then dilute the solution with clean, Pb-free extraction fluid to vary the concentration of $Pb^{2+}$ in the solution in order to examine the effect of Pb concentration ([Pb]) on the Pb capture of the calcium phosphate barrier film.

FIGS. 9A and 9B plot the [Pb] and concentration of calcium ([Ca]) over an interval of 18 h resulting from the extraction of Pb-containing TCLP extraction fluid and barrier film in a 20:1 ratio by weight as required by the TCLP procedure. The relative [Pb] for each of the extractions inversely correlates with the relative [Ca], indicating that a cation exchange reaction is taking place between $Ca^{2+}$ from the calcium phosphate in the barrier film and $Pb^{2+}$ in solution to form less soluble lead phosphate. Importantly, at each initial concentration of Pb ($[Pb]_i$), the barrier film is able to reduce the [Pb] below the US RCRA hazardous waste limit of 5 mg $L^{-1}$ revealing promising potential for improving the regulatory compliance of perovskite PVs.

It is noted that the final [Ca] ($[Ca]_f$) for each extraction indicates that the barrier film is not dissolving completely and releasing all of the calcium phosphate it contains into solution over this 18 h interval. There are ~300 mg of Ca per g of barrier film, which in a 20:1 ratio by weight TCLP extraction fluid to barrier film would yield a [Ca] of 15,000 mg $L^{-1}$ if all of the calcium phosphate in the barrier film were released during the extraction. However, the ratio of $[Ca]_f$ to $[Pb]_i$ in mol $L^{-1}$ (Table 2) does not indicate a direct one-to-one exchange of $Ca^{2+}$ and $Pb^{2+}$ either, as the ratio increases with decreasing $[Pb]_i$. Instead, the calcium phosphate in the barrier film is likely partially soluble in the extraction matrix, releasing additional $Ca^{2+}$ into solution during extraction that does not result from direct cation exchange with $Pb^{2+}$.

TABLE 2

Analysis of initial and final Pb and Ca concentrations depicted in FIGS 9A and 9B.
Data are represented as mean ± standard deviation.

| $[Pb]_i$ (mM) | $[Ca]_f$ (mM) | $[Ca]_f/[Pb]_i$ | Captured Pb: $[Pb]_i$-$[Pb]_f$ (mM) | Excess Ca not involved in Pb capture: $[Ca]_f$-($[Pb]_i$-$[Pb]_f$) (mM) |
|---|---|---|---|---|
| 3.48 ± 0.02 | 6.46 ± 0.07 | 1.86 ± 0.02 | 3.47 ± 0.02 | 2.99 ± 0.08 |
| 1.56 ± 0.01 | 6.6 ± 0.1 | 4.20 ± 0.07 | 1.55 ± 0.01 | 5.0 ± 0.1 |
| 0.115 ± 0.004 | 4.94 ± 0.05 | 43 ± 2 | 0.093 ± 0.004 | 4.85 ± 0.05 |

pH Dependence

Although US hazardous waste regulation mandates a specific pH range and extraction matrix to test the mobility of Pb, the performance of the calcium phosphate barrier film under alternative conditions to determines its efficacy at Pb capture in a wide range of environments can be studied.

Low pH

To study the performance of the barrier film under more acidic conditions (low pH), a solution of lead nitrate ($Pb(NO_3)_2$) was dissolved in 7.9 mM nitric acid ($HNO_3$), and compare the [Pb] and [Ca] over the course of an 18 h extraction of calcium phosphate barrier film with this solution to an extraction of barrier film with $PbI_2$ dissolved in TCLP extraction fluid. Despite similar $[Pb]_i$ (721±5 mg $L^{-1}$ for the solution of $PbI_2$ dissolved in TCLP extraction fluid and 701±9 for the solution of $Pb(NO_3)_2$ dissolved in 7.9 mM $HNO_3$), the barrier film more effectively captures and contains dissolved $Pb^{2+}$ in the low pH extraction matrix. The [Pb] drops below the RCRA hazardous waste limit in 30 min for the $HNO_3$ matrix compared to 8 h for the TCLP extraction fluid matrix, and the [Ca] also increases more rapidly, indicating that the cation exchange reaction between the $Ca^{2+}$ in the calcium phosphate barrier film and $Pb^{2+}$ in solution is faster under these low pH conditions. Interestingly, while calcium phosphate is typically more soluble at lower pH, the $[Ca]_f$ is similar for both extractions. The $[Pb]_f$ however is an order of magnitude lower for the low-pH extraction, likely because the TCLP extraction fluid is more effective at dissolving Pb. See, FIGS. 10A-10B.

Faster cation exchange reaction of the low pH extraction matrix is unlikely to be due to the alternative anion of the dissolved Pb compound ($NO_3^-$ rather than $I^-$), as an extraction of calcium phosphate barrier film with similar $[Pb]_i$ (642±4 mg $L^{-1}$ Pb from dissolved $PbI_2$ and 670±10 mg $L^{-1}$ Pb from dissolved $Pb(NO_3)_2$) and the same TCLP extraction fluid matrix yields nearly identical Pb capture behavior. See FIGS. 10A-10B.

High pH

To study the performance of the barrier film under more basic conditions (high pH), a solution of lead acetate ($Pb(CH_3COO)_2$) was dissolved ASTM Type II water, and compare the [Pb] and [Ca] over the course of an 18 h extraction of calcium phosphate barrier film with this solution to an extraction of barrier film with $PbI_2$ dissolved in TCLP extraction fluid. The barrier film is ineffective at capturing and containing dissolved $Pb^{2+}$ in the high pH extraction matrix that despite similar $[Pb]_i$ (325±2 mg $L^{-1}$ for the solution of $PbI_2$ dissolved in TCLP extraction fluid and 422±5 mg $L^{-1}$ for the solution of $Pb(CH_3COO)_2$ dissolved ASTM Type II water). The [Pb] never approaches the RCRA hazardous waste limit for the high pH extraction matrix, only decreasing to 284±4 mg $L^{-1}$ after 18 h of extraction with barrier film, while the TCLP extraction matrix achieves a [Pb] of 220±3 mg $L^{-1}$ after just 5 min. The [Ca] is similarly stagnant, indicating that the cation exchange reaction between the $Ca^{2+}$ in the calcium phosphate barrier film and $Pb^{2+}$ in solution is much slower in the high pH extraction matrix. This decreased reactivity is likely due to the lower solubility of calcium phosphate at high pH. See FIGS. 10C-10D.

Barrier Film Robustness

An ideal chemical barrier film for perovskite PVs should be able to effectively capture and contain Pb even after significant weathering. To investigate the robustness of the calcium phosphate barrier film against mechanical agitation and chemical digestion, a barrier film Pb capture after multiple extractions with $PbI_2$-saturated TCLP extraction fluid was investigated. Following one 18±2 h extraction with end-over-end agitation, barrier film is recollected, allowed to dry in air for 8 h, and then placed into a second solution of $PbI_2$-saturated TCLP extraction fluid solution and extracted for a second 18±2 h interval. This process is then repeated again with a 10-day rather than 8-h drying time.

Figure 15:
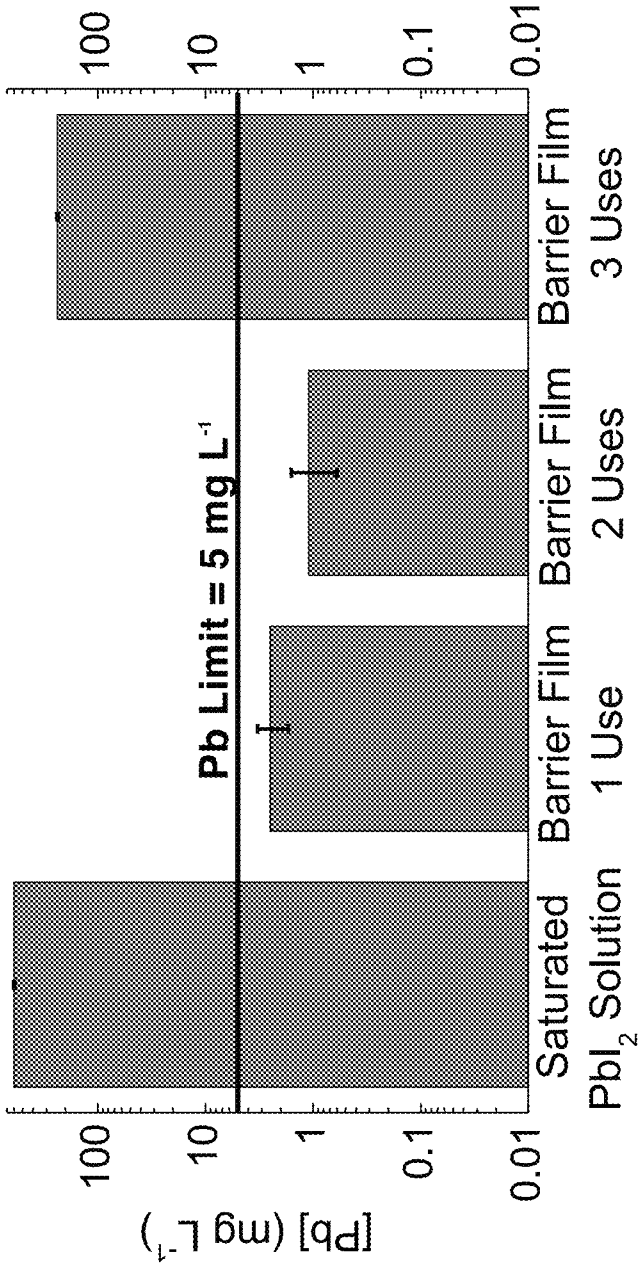
FIG. 15 shows barrier film Pb capture after multiple TCLP extractions with $PbI_2$-saturated TCLP extraction fluid.

As shown in FIG. 15, for the first two extractions, the barrier film successfully decreases the [Pb] below the EPA hazardous waste limit, reducing the amount of Pb in solution by over 99%. However, upon the third extraction, the barrier film only reduces the [Pb] by 60%. While further improvements could be made to the barrier film robustness, the maintained performance at Pb capture across two TCLP extractions is still quite promising, as the TCLP is meant to simulate the entire lifetime of waste degradation in a landfill.[67]

Figure 16:
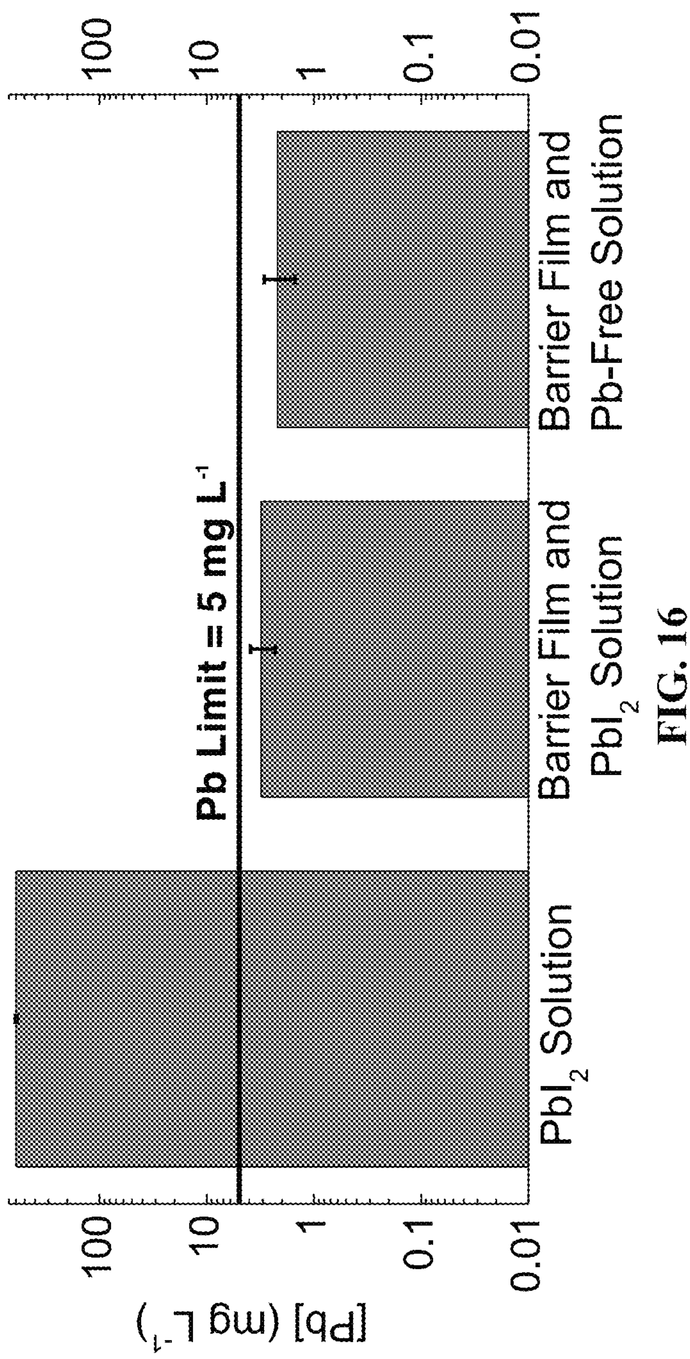
FIG. 16 shows barrier film Pb containment.

Next, to determine the efficacy of the barrier film at containing captured Pb, barrier film was extracted with $PbI_2$-saturated TCLP extraction fluid for 18±2 h, then dry the film in air for 8 h and extract with clean, Pb-free TCLP extraction fluid for a second 18±2 h interval. FIG. 16 reveals that less than 1% of the Pb captured by the barrier film is released during this second extraction, and the [Pb] leached by the barrier film is below the RCRA hazardous waste limit, indicating that the barrier film would not require hazardous waste disposal following Pb capture from perovskite PVs. Furthermore, the similar [Pb] following the extraction of the barrier film with $PbI_2$-saturated and clean TCLP extraction fluids indicates that all of the Pb in solution is likely captured by the barrier film during the 18±2 h extraction interval, and the [Pb] of the solution is therefore determined by the solubility of the Pb phosphate compounds contained in the barrier film. Referring to FIG. 16, barrier film is first extracted with $PbI_2$-saturated TCLP extraction fluid to capture Pb, and then extracted with clean, Pb-free TCLP extraction fluid to determine the efficacy of the barrier film at containing captured Pb. Data are represented as mean±standard deviation.

Maximum Capture of Pb

As discussed herein, there can be ~300 mg of Ca per g of calcium phosphate barrier film. This would correspond to a theoretical maximum capture of 15.5 g of Pb per g of barrier film, the Ca in the barrier film is not fully soluble in any of the extraction matrices tested, and indeed most $Pb^{2+}$ absorbents do not achieve their theoretical maximum adsorption.

Figure 17:
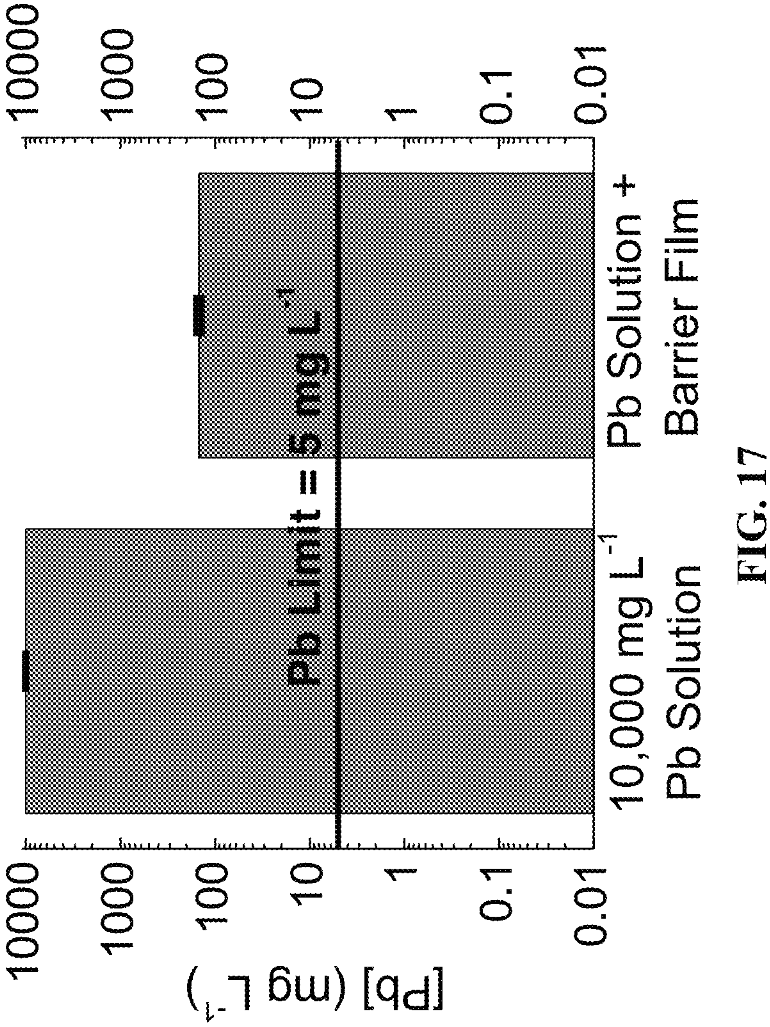
FIG. 17 shows barrier film Pb capture in 10,000 mg $L^{-1}$ Pb solution.

To determine the experimental maximum Pb capture of the barrier film, an extraction with a solution of 10,000 mg $L^{-1}$ Pb in dilute $HNO_3$ was performed, combining the solution and barrier film in a 20:1 ratio by weight and extracting for 18±2 h. FIG. 17 reveals that while the barrier film was unable to reduce the [Pb] below the hazardous waste limit of 5 mg $L^{-1}$, over 98% of Pb was removed from the solution by the barrier film, yielding a sorption capacity of 197 mg Pb per g of barrier film for this interval, which exceeds the performance of previous Pb-absorbent polymers evaluated at similar pH but with longer contact times between the polymer and Pb solution (120 h instead of 18 h). Data are represented as mean±standard deviation.

Pb Capture from Perovskite PVs

Having observed the calcium phosphate barrier film's promising performance at extracting Pb from aqueous solution, the efficacy of the barrier film at preventing the release of Pb from perovskite PVs under the catastrophic failure conditions simulated by the TCLP was investigated. By performing the TCLP on $MAPbI_3$ perovskite films with and without barrier film applied to the surface, reductions in Pb lead leaching below the 5 mg $L^{-1}$ hazardous waste limit for both glass and flexible substrates (FIGS. 18A-18B) were observed, with an 84% reduction in Pb leaching for the perovskite film on glass and 99.8% reduction for the film on PET adjusted for weight.

Importantly, these reductions in Pb leaching are achieved with the barrier film alone. No additional layers of glass are added to the encapsulation architecture.

Figure 18A:
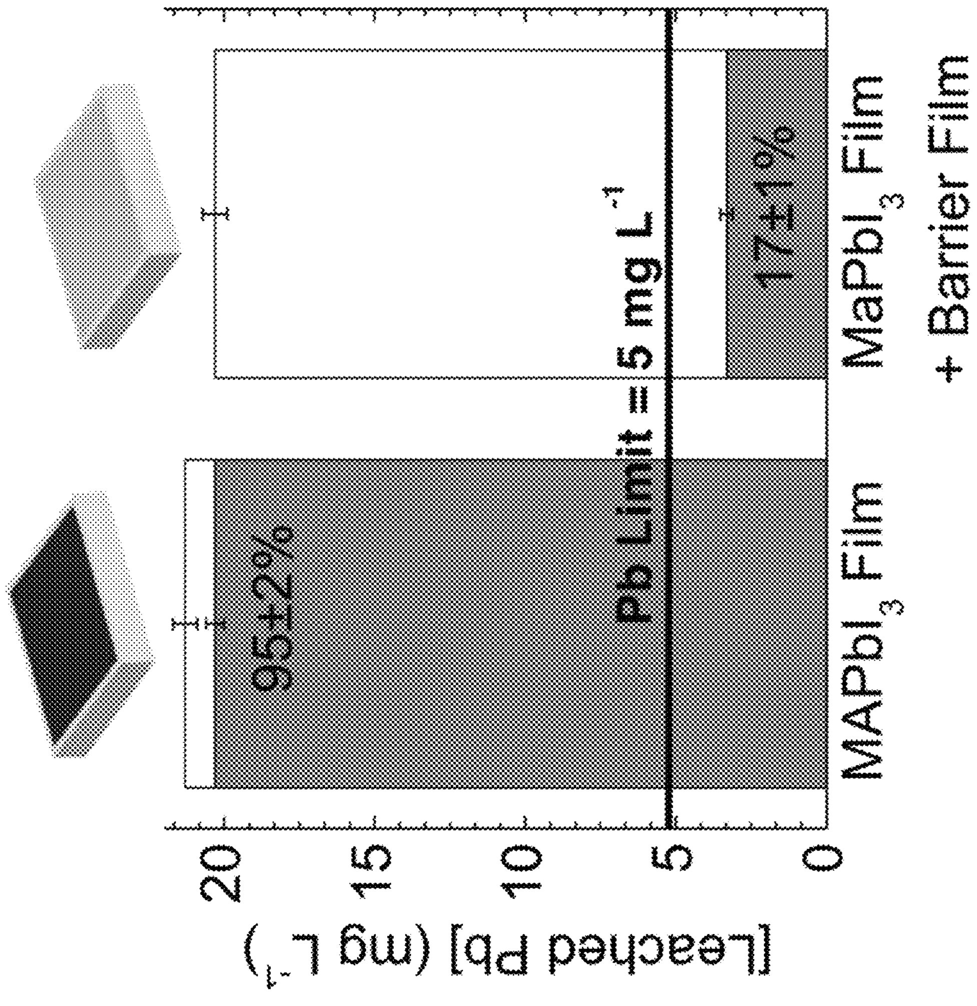
FIGS. 18A-18B show leaching behavior with a calcium phosphate barrier film.
Figure 18B:
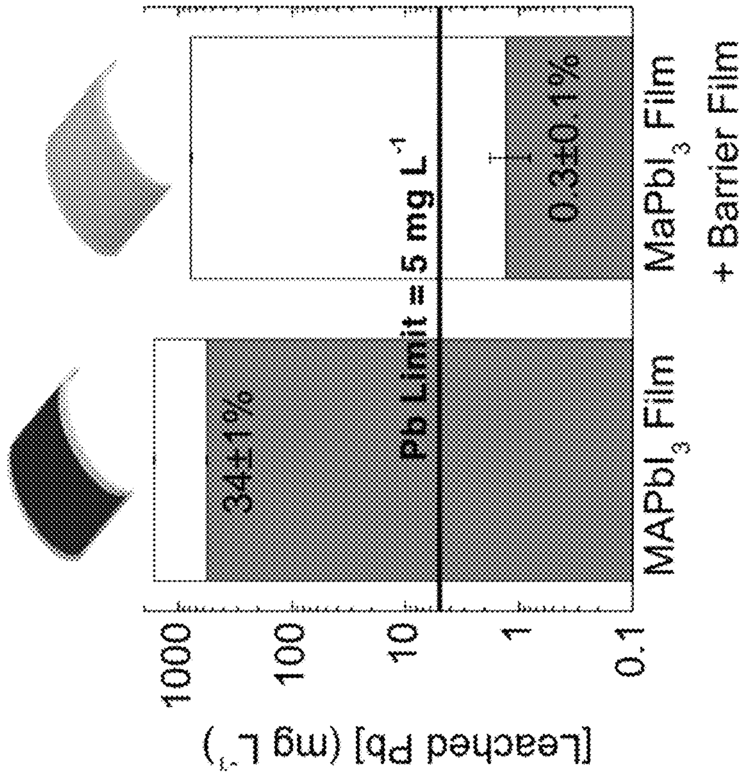

Referring to FIG. 18A, TCLP Pb leaching comparison of a bare $MAPbI_3$ perovskite thin film on glass and a $MAPbI_3$ perovskite thin film with barrier film applied. Referring to FIG. 18B, TCLP Pb leaching comparison of a bare $MAPbI_3$ perovskite thin film on PET and a $MAPbI_3$ perovskite thin film with barrier film applied. The gray portions of each bar chart represent leached Pb while the white portions represent total available Pb. Data are represented as mean±standard deviation, and the total available Pb and leaching percentages (leached Pb versus total available Pb) are adjusted for the added weight of the barrier film, since the TCLP is performed on a per weight basis.

Pb Exposure Risk Reduction

The reduction in perovskite Pb leaching achieved by the addition of calcium phosphate barrier film reduces the risk of Pb exposure, preventing the Pb in perovskites from solubilizing and contaminating the surrounding environment. To quantify the magnitude of Pb exposure risk reduction, a conservative, worst-case estimation of the Pb concentration in groundwater following the landfilling of a 5 $MW_{DC\text{-}peak}$ solar plant with flexible $MAPbI_3$ perovskite modules with and without barrier film applied was performed.

Figure 19:
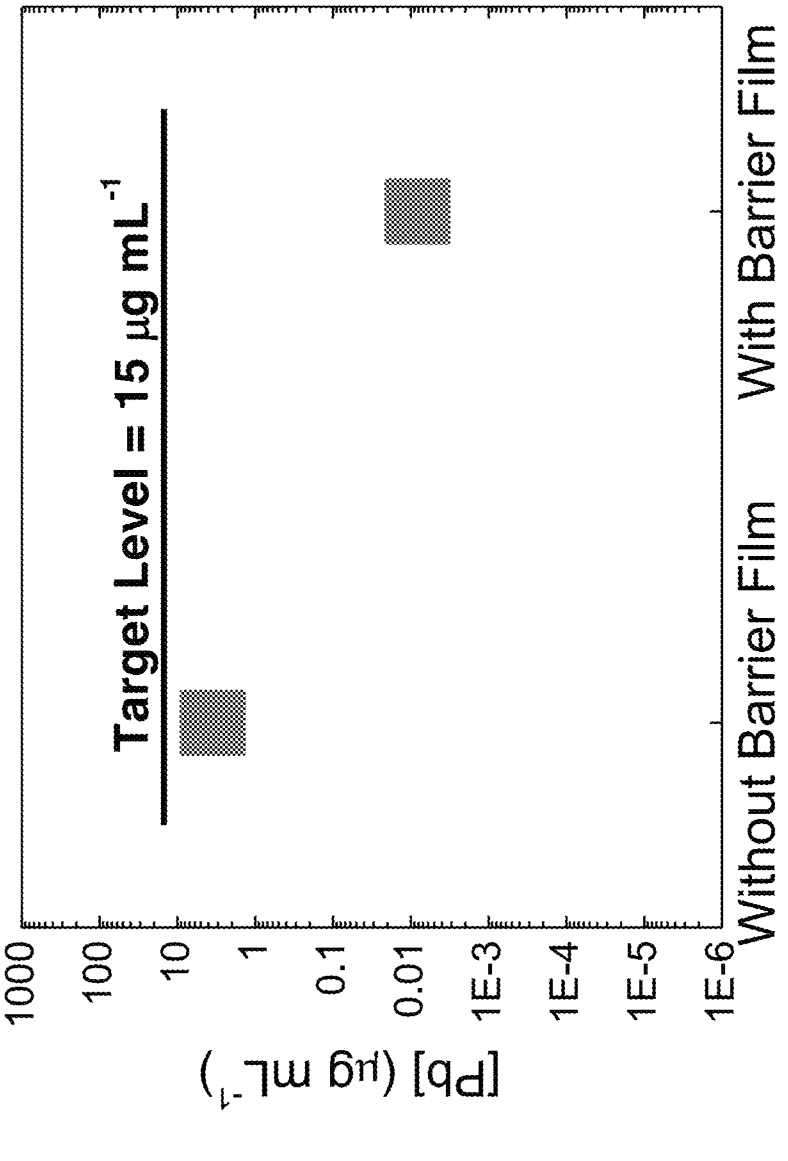
FIG. 19 shows estimated lead exposure point concentrations for groundwater.

It was observed that for $MAPbI_3$ perovskite modules without calcium phosphate barrier film, the [Pb] in groundwater is only a factor of 4 below the EPA drinking water Pb limit, but when the barrier film is applied, the [Pb] drops by 3 orders of magnitude. See, FIG. 19. The calcium phosphate barrier film is thus an effective means of reducing the risk of Pb exposure from landfilled perovskite PVs. Referring to FIG. 19, estimated lead exposure point concentrations for groundwater (gray squares) resulting from landfilling a hypothetical 5 MW $MAPbI_3$ perovskite solar project with and without calcium phosphate barrier film relative to the U.S. Environmental Protection Agency target level for acceptable risk (black line).

Recycling of Captured Pb

Once Pb is captured from perovskite films and contained within the polymer matrix of the calcium phosphate barrier film, it can be converted into other Pb compounds, since Pb infinitely recyclable. Recycling captured Pb is indeed an important endeavor, as the Waste Electrical and Electronic Equipment (WEEE) Directive mandates the recycling of PV module components, and reuse of captured Pb would prevent its release into the environment should the barrier film disintegrate under extreme conditions.

Figure 20:
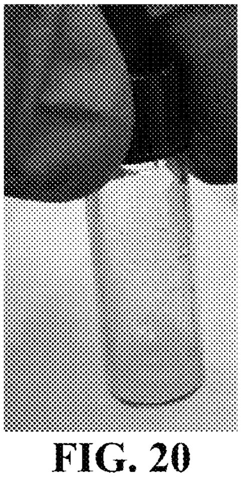
FIG. 20 shows lead iodide formed from captured lead.

One particularly advantageous compound to form from captured Pb is $PbI_2$, as it can be used to form new perovskite PVs. To form $PbI_2$ from Pb captured by the calcium phosphate barrier film, the polymer matrix of the film was dissolved in tetrahydrofuran (THF), separating it from the inorganic lead phosphate via centrifugation. The lead phosphate is then dissolved into its component ions with 0.1 M $HNO_3$. Finally, $PbI_2$ is precipitated from the $Pb^{2+}$ in solution via the addition of KI. The formation of a yellow precipitate shown in FIG. 20 indicates that $PbI_2$ is successfully formed with this synthetic process.

In summary, a barrier layer can be created by introducing an ion exchange polymer barrier film based on inexpensive, non-toxic polymers and calcium phosphate that captures and contains leached Pb. The barrier film is able to reduce the [Pb] from aqueous solutions of $HNO_3$ and TCLP extraction fluid and Pb leaching from $MAPbI_3$ perovskite films below the RCRA hazardous waste limit of 5 mg $L^{-1}$, and shows substantial robustness against physical and chemical degradation.

Experimental Procedures

Heavy Metal Barrier Fabrication

In a typical synthesis, 0.2 grams of Poly(methyl methacrylate-co-methacrylic acid), 0.05 grams of Polyethylene oxide, 0.025 g Butylated Hydroxytoluene and 0.75 grams of Calcium Phosphate were weighed in vial. 2.5 mL of toluene was added and the vial and was stirred overnight at 60 C to disperse all solids. Inks were cast in pre-fabricated wells and allowed to dry at 60 C under vacuum for at least an hour. Films were then diced and used in TCLP and other extraction matrices to determine heavy metal capture.

Total Lead Content Characterization

To determine total lead content by weight of perovskite and polycrystalline silicon thin films and solar cells, samples were digested in a 1M $HNO_3$ solution in a fixed ratio by weight liquid to solid using a Milestone UltraWave microwave sample-digestion system at 1500 W. The digestion consisted of two steps: 15 minutes at 180° C. and 120 bar, and 10 minutes at 220° C. and 150 bar. Following digestion, samples were diluted with ASTM Type II water to yield a final $HNO_3$ concentration of 2%, filtered with 0.2 μm PTFE syringe filters, and characterized using ICP-OES analysis.

TCLP Extraction Fluid Determination

A TCLP extraction fluid determination was performed for both the perovskite films and the barrier film in separate experiments according to the literature.[66] Briefly, 5.0 g of perovskite films on glass and barrier film were each crushed to a particle size of approximately 1 mm in diameter or less. The solids were then transferred to a 500 mL beaker, and 96.5 mL of ASTM Type II water was added. The beaker was then covered with a watch glass and stirred vigorously for 5 minutes using a magnetic stirrer. The pH of the solution was found to be >5.0 in both cases, so 3.5 mL of 1 N HCl was added. The resulting mixture was slurried briefly, covered with a watch glass, and heated at 50° C. for 10 minutes. The solution was then cooled to room temperature. The pH of the resulting solution was found to be <5.0 in both cases, so TCLP Extraction Fluid #1 was used for all TCLP leaching experiments.

TCLP Extraction Fluid #1 Preparation

Glacial acetic acid (5.7 mL), ASTM Type II water (500 mL), and 1N NaOH (64.3 mL), were combined and then diluted to a volume of 1 liter to create TCLP Extraction Fluid #1. The pH was confirmed to be within the range specified by the literature: 4.93±0.05. The extraction fluid was monitored frequently for impurities using ICP-OES, and the pH was checked prior to each use.

$PbI_2$-Saturated TCLP Extraction Fluid Preparation

Following the preparation of TCLP Extraction Fluid #1, solid $PbI_2$ powder was extracted in a 20:1 ratio by weight extraction fluid to sample. The extraction mixture was then rotated in an end-over-end fashion using a tube rotator at 30±2 rpm for 18±2 h. At the end of the extraction period, solid $PbI_2$ powder remained in solution, but it was observed that the concentration of Pb in the supernatant did not increase even after several weeks of storage, indicating that the 18±2 h extraction interval was sufficient to achieve a saturated solution at room temperature. Following extraction, the supernatant solution of $Pb^{2+}$ was filtered with a 0.7 μm borosilicate glass fiber filter.

Low pH Extraction Fluid Preparation 1.05 mL of 10,000 mg $L^{-1}$ Pb dissolved from $Pb(NO_3)_2$ in 0.5% v/v nitric acid ($HNO_3$) was diluted to a concentration of 700 mg $L^{-1}$ Pb via the addition of 13.95 mL of ASTM Type II water, resulting in a solution pH of 2.1.

$Pb(NO_3)_2$ TCLP Extraction Fluid Preparation 1.05 mL of 10,000 mg $L^{-1}$ Pb dissolved from $Pb(NO_3)_2$ in 0.5% v/v $HNO_3$ was first diluted to a concentration of 700 mg $L^{-1}$ Pb via the addition of 13.95 mL of TCLP Extraction Fluid #1. The pH of the solution was then adjusted to 4.93±0.05 via the addition of 158 μL of 0.8 M NaOH.

High pH Extraction Fluid Preparation 33 mg of lead (II) acetate was dissolved in 50 mL of ASTM Type II water, resulting in a solution pH of 9.7.

10,000 mg $L^{-1}$ Pb Extraction Fluid Preparation 10,000 mg $L^{-1}$ Pb dissolved from $Pb(NO_3)_2$ in 0.5% v/v nitric acid ($HNO_3$) was purchased as an ICP standard and used with no further alterations to the solution.

Particle Size Reduction

Perovskite films and devices on glass substrates were first weighed and then crushed by placing the samples between two polystyrene weighing dishes and smashing with a hammer until all pieces were reduced to smaller than 1 cm in narrowest dimension and capable of passing through a 9.5 mm standard sieve. Perovskite films on PET substrates were reduced to the same dimensions by cutting with scissors rather than crushing. Barrier film samples were reduced to the same dimensions by breaking larger pieces apart with tweezers.

Extraction Procedure

Following particle size reduction, samples were transferred to polypropylene tubes. 50 mL tubes with polyethylene lined caps were used for samples on perovskite films and devices on glass substrates, 15 mL centrifuge tubes were used for the ultrabarrier film study, and 2.0 mL microcentrifuge tubes were used for all other perovskite samples on PET substrates and all extractions described herein. Extraction fluid was then added in a 20:1 ratio by weight extraction fluid to solids. The extraction mixture was then rotated in an end-over-end fashion using a tube rotator at 30±2 rpm for the desire time interval.

Filtration of Extraction Mixture

Following the sample agitation period, the extraction mixture was filtered with a 0.7 μm borosilicate glass fiber filter. Because of the small extraction volumes, filtration did not follow the literature specifications for the TCLP procedure of a filter holder with minimum internal volume of 300 mL equipped to accommodate a minimum filter size of 47 mm. Instead, Flipmate 50 assemblies were used for perovskite samples on glass substrates and syringe filters were used for all other samples. Immediately following filtration, all samples were acidified with $HNO_3$ to a pH of <2 (the final $HNO_3$ concentration was 2%). If the resulting extract could not be analyzed within 6 hours, samples were stored under refrigeration (4° C.) until analyzed.

ICP-OES Analysis

Due to the concentration range (mg $L^{-1}$) of the samples, inductively coupled plasma optical emission spectroscopy (ICP-OES) was selected for chemical analysis. The acidified samples were filtered with 0.2 μm PTFE syringe filters prior to ICP-OES analysis. Analysis was performed with an Agilent 5100 system, with concentration standards of 1, 10, and 100 mg $L^{-1}$, Pb characterization wavelengths of 179.605, 182.143, 217.000, 220.353, 261.417, 280.199, and 283.305 nm, and Ca characterization wavelengths of 183.944, 315.887, 317.933, 318.127, 370.602, 373.690, 396.847, and 422.673 nm. Quality control procedures included routine matrix spikes, which showed 90-95% recovery and <1 relative percent difference (RPD), laboratory control samples, which were within ±10% of the target element spike values, and duplicate samples, which showed <2 RPD.

Other embodiments are within the scope of the following claims.

What is claimed is:

1. A heavy metal capture composition comprising:

a matrix material comprising polyethylene oxide, the matrix material having a complexing moiety; and an ion exchangeable material comprising calcium phosphate, wherein the ion exchangeable material binds to the heavy metal to reduce an amount of leached heavy metal.

2. The heavy metal capture composition of claim 1, wherein the amount of leached heavy metal is reduced by at least 10% when the heavy metal capture composition is present compared to when the heavy metal capture composition is not present.

3. The heavy metal capture composition of claim 1, wherein the ion exchangeable material traps the heavy metal in the composition, or forms a flocculate or a precipitate with the heavy metal.

4. The heavy metal capture composition of claim 1, wherein the ion exchangeable material is at least 5% of the heavy metal capture composition by weight.

5. The heavy metal capture composition of claim 1, wherein the heavy metal includes at least one of lead, mercury, cesium, cadmium, barium, or chromium.

6. The heavy metal capture composition of claim 1, wherein the matrix material further comprises a polyacrylate.

7. The heavy metal capture composition of claim 6, wherein the polyacrylate comprises a polymethacrylate.

8. The heavy metal capture composition of claim 7, wherein the polymethacrylate comprises a poly(methyl methacrylate).

9. The heavy metal capture composition of claim 1, wherein the matrix material further comprises poly(methyl methacrylate-co-methacrylic acid).

10. A heavy metal capture composition comprising:

a matrix material comprising polyethylene oxide and an ion exchangeable material comprising a phosphate;

wherein the ion exchangeable material binds to the heavy metal to reduce an amount of leached heavy metal.

11. The heavy metal capture composition of claim 10, wherein the phosphate comprises an ammonium phosphate, an alkali metal phosphate, and/or an alkaline earth metal phosphate.

* * * * *